(12) United States Patent
Oohara et al.

(10) Patent No.: US 8,575,886 B2
(45) Date of Patent: Nov. 5, 2013

(54) POWER STORAGE APPARATUS OF POWER GENERATION SYSTEM AND OPERATING METHOD OF POWER STORAGE APPARATUS

(75) Inventors: Shinya Oohara, Hitachinaka (JP); Naoki Hoshino, Hitachi (JP); Masaki Rikitake, Hitachi (JP)

(73) Assignee: Hitachi Engineering & Services Co., Ltd., Ibaraki (JP)

( * ) Notice: Subject to any disclaimer, the term of this patent is extended or adjusted under 35 U.S.C. 154(b) by 343 days.

(21) Appl. No.: 12/865,108

(22) PCT Filed: Sep. 10, 2009

(86) PCT No.: PCT/JP2009/004488
§ 371 (c)(1),
(2), (4) Date: Jul. 28, 2010

(87) PCT Pub. No.: WO2011/030380
PCT Pub. Date: Mar. 17, 2011

(65) Prior Publication Data
US 2011/0193516 A1    Aug. 11, 2011

(51) Int. Cl.
*H01M 10/44* (2006.01)
*F03D 9/00* (2006.01)
*B60L 9/00* (2006.01)

(52) U.S. Cl.
USPC ............................... 320/101; 290/44; 701/22

(58) Field of Classification Search
USPC ............................................ 320/101; 290/44
See application file for complete search history.

(56) References Cited

U.S. PATENT DOCUMENTS

| | | | | |
|---|---|---|---|---|
| 5,834,922 A | * | 11/1998 | Ikawa et al. | 320/136 |
| 6,160,382 A | * | 12/2000 | Yoon et al. | 320/136 |
| 6,430,482 B1 | * | 8/2002 | Wakashiro et al. | 701/22 |
| 7,406,389 B2 | * | 7/2008 | Emori et al. | 702/85 |
| 7,642,666 B2 | * | 1/2010 | Ichinose et al. | 290/44 |
| 7,667,436 B2 | * | 2/2010 | Ito et al. | 320/150 |
| 7,952,224 B2 | * | 5/2011 | Sawada et al. | 307/9.1 |
| 2009/0295162 A1 | | 12/2009 | Oohara et al. | |
| 2011/0101915 A1 | * | 5/2011 | Mitsutani | 320/109 |

FOREIGN PATENT DOCUMENTS

| | | |
|---|---|---|
| JP | 2000-312445 A | 11/2000 |
| JP | 2006-141093 A | 6/2006 |
| JP | 2007-306670 A | 11/2007 |
| JP | 2008-99461 A | 4/2008 |
| JP | 2009-44862 A | 2/2009 |
| JP | 2009-79559 A | 4/2009 |
| JP | 2009-261076 A | 11/2009 |
| WO | 2009/019992 A1 | 2/2009 |

* cited by examiner

*Primary Examiner* — M'Baye Diao
(74) *Attorney, Agent, or Firm* — Mattingly & Malur, PC

(57) ABSTRACT

A power storage apparatus is installed in connection with a power generation system using natural energy generation power. The power storage apparatus is comprised of a control unit and a plurality of electricity storage devices. The control unit is structured to calculate a target value of power station output, to calculate a charge and discharge power instruction of each of the plurality of electricity storage devices, and to instruct the charge and discharge. The control unit calculates a correction value of the charge and discharge power to be charged and discharged by the power storage apparatus to permit the charge rate of the plurality of secondary batteries to follow an individual charge rate target value.

13 Claims, 15 Drawing Sheets

OUTPUT POWER OF WIND POWER STATION

CHARGE AND DISCHARGE OF EACH ELECTRICITY STORAGE DEVICE

CHARGE RATE OF EACH ELECTRICITY STORAGE DEVICE

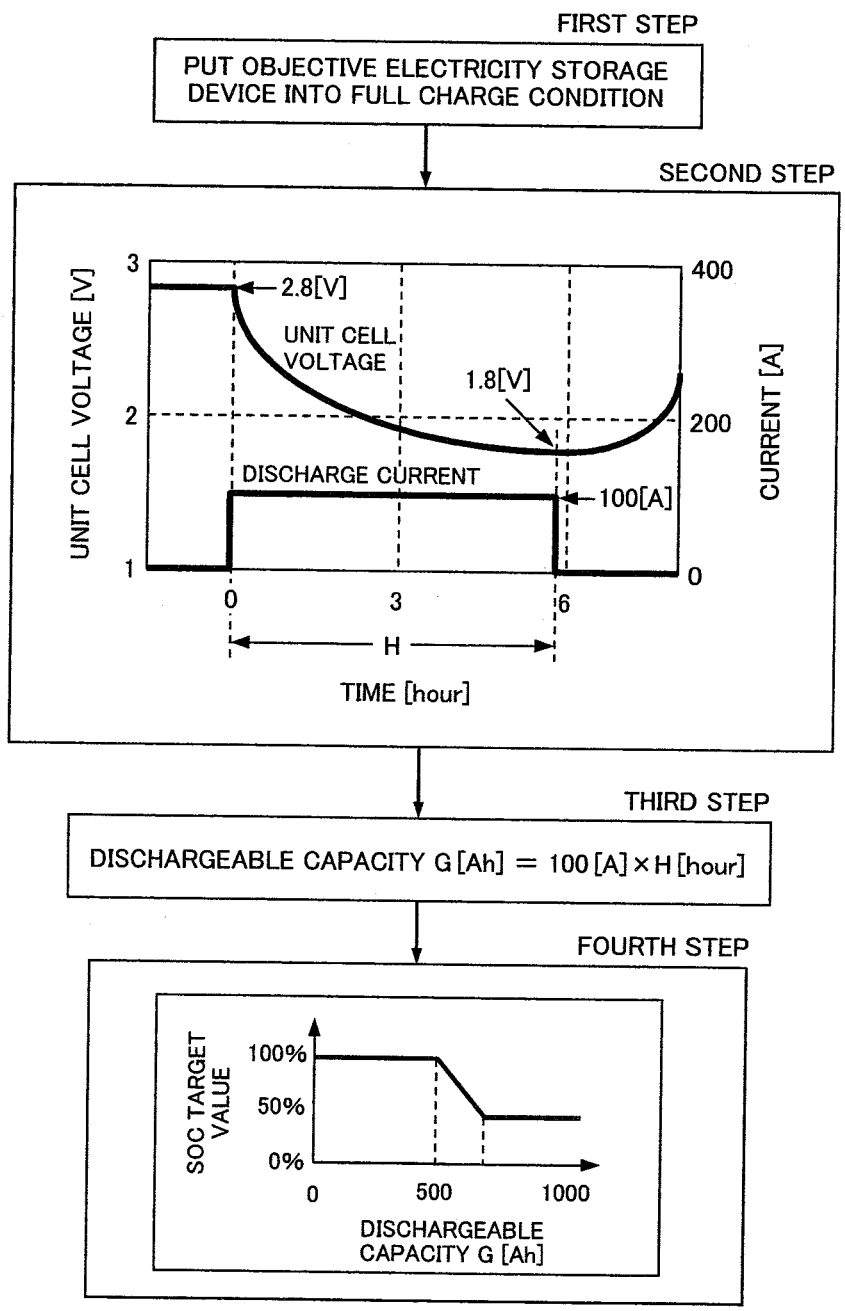

POWER STORAGE APPARATUS OF POWER GENERATION SYSTEM AND OPERATING METHOD OF POWER STORAGE APPARATUS

TECHNICAL FIELD

The present invention relates to a power storage apparatus of a power generation system connected to a power system in parallel with the power generation system the generation power of which changes with time for charging and discharging so as to relieve power change of the power generation system with the generation power changed and an operating method of the power storage apparatus.

BACKGROUND ART

As a means for converting renewable-energy existing in nature to power energy, a wind power generation system and a solar photovoltaic system are used. The energy sources of the wind power generation system and solar photovoltaic system are wind energy and solar energy that change with time, so that the generation power of the power generation system changes with time.

The power system adjusts the generation power of a thermal power station, a hydroelectric power station, or a pumping-up electric power station according to the magnitude of power demands, thereby keeping balance with power demands. Therefore, when a greatly-changeable power source of the wind power generation system or solar photovoltaic system is connected to the power system in a large quantity, there is a worry about insufficient adjustment of the balance in supply and demand and enlargement of the frequency change.

To avoid it, it is necessary to install a power storage apparatus in the wind power generation system or the solar photovoltaic system and provide a means for charging and discharging changeable generation power of the wind power generation system or the solar photovoltaic system by the power storage apparatus, thereby relieving the power change outputted to the power system.

As a power storage apparatus for relieving the power change of natural energy, in Japanese Patent Laid-open No. 2007-306670, a charging and discharging art for preventing the storage electric energy of a storage battery from being deviated to the upper limit value or the lower limit value for a long period of time is described.

As the power generation capacity of the power generation system such as the wind power generation system or the solar photovoltaic system is enlarged, the power compensation capacity of the power storage apparatus is also increased greatly. A large capacity of the power storage apparatus can be generally realized by connecting a plurality of electricity storage devices including secondary batteries and power control units in parallel. Therefore, it is necessary to decide a distribution method of a charge and discharge power instruction to the plurality of electricity storage devices.

As a power instruction distribution method of the power storage apparatus composed of a plurality of electricity storage devices, for example, in Japanese Patent Laid-open No. 2009-044862, an art for a power source control unit of an electric car to detect the deterioration condition of the secondary batteries and distribute a small quantity of the power instruction to the deterioration-progressed electricity storage device is described.

Further, in the wind power generation system including the power storage apparatus, as an art for relieving the power change and reducing the power loss accompanying the charge and discharge of the storage batteries, a power generation system structured so as to decide, from the maximum value and minimum value of the output power of the wind power generation apparatus and power storage apparatus in the past for a given period, the outputtable range in the next period and decide the charge and discharge electric energy of the power storage apparatus and a power limit instruction of the wind power generation apparatus so as to control the output power of the wind power generation apparatus and power storage apparatus within the outputtable range is disclosed in Japanese Patent Laid-open No. 2009-079559.

DOCUMENT OF PRIOR ART

Patent Document

Patent Document 1: Japanese Patent Laid-open No. 2007-306670
Patent Document 2: Japanese Patent Laid-open No. 2009-044862
Patent Document 3: Japanese Patent Laid-open No. 2009-079559

DISCLOSURE OF THE INVENTION

Problems to be Solved by the Invention

When using lead-acid batteries for the secondary batteries composing the electricity storage devices of the power storage apparatus for relieving the power change, the lead-acid batteries have a deterioration mode called sulfation as one of the deterioration modes. This is a phenomenon that when the lead-acid batteries are left in the discharge condition (the charging rate is low) for a long period of time, crystals of low-soluble sulfate are educed on the electrodes of the lead-acid batteries.

If sulfation is generated, the dischargeable capacity of each lead-acid battery is reduced and the internal resistance thereof is increased, so that the charge and discharge enabled range of the lead-acid batteries is narrowed consequently and the change relieving ability of the power storage apparatus is lowered. To avoid the deterioration mode called sulfation, it is desirable to keep the charge rate (hereinafter referred to as SOC) of the lead-acid batteries slightly high.

For example, in the art described in Japanese Patent Laid-open No. 2007-306670, to surely obtain the change relieving effect, a system for suppressing the deviation of the storage electric energy of the storage batteries or SOC is investigated, though from the viewpoint of deterioration suppression, an art for positively changing the SOC is not disclosed at all.

As a power instruction distribution method of the power storage apparatus composed of a plurality of electricity storage devices, for example, in Japanese Patent Laid-open No. 2009-044862, an art for deciding the charge and discharge power instruction distribution ratio according to the deterioration degree is described, though a means for controlling the SOC of each secondary battery is not disclosed and it is difficult to delay the progress of the sulfation which is an intrinsic deterioration mode of the lead-acid batteries.

Further, in the art described in Japanese Patent Laid-open No. 2009-079559, the SOC of the secondary batteries is controlled, though an art for changing the SOC in consideration of the deterioration degree of the secondary batteries is not disclosed, so that a problem arises that it is difficult to delay the progress of the deterioration of the secondary batteries.

An object of the present invention is to provide a power storage apparatus of a power generation system for enabling extension of the overall operation period of the power storage apparatus having electricity storage devices for delaying further progress of deterioration of deterioration-progressed secondary batteries among a plurality of secondary batteries composing the electricity storage devices, thereby including both deterioration-progressed secondary batteries and deterioration-unprogressed secondary batteries and an operating method of the power storage apparatus of the power generation system.

Means for Solving the Problems

A power storage apparatus of a power generation system of the present invention is a power storage apparatus installed in connection with the power generation system using natural energy the generation power of which changes with time for relieving the generation power change of the power generation system by executing charge and discharge, wherein the power storage apparatus is composed of a control unit and a plurality of electricity storage devices, and the plurality of electricity storage devices are composed of converters and secondary batteries, and the control unit includes a power station output target value calculator for calculating the target value of the power station output, a charge and discharge power calculator for calculating a change relief charge and discharge instruction to be charged and discharged by each of the plurality of electricity storage devices on the basis of the target value of the power station output calculated by the power station output target value calculator, a charge rate target value calculator for calculating the charge rate target value of the plurality of electricity storage devices, a charge rate calculator for detecting the charge rate of the secondary batteries of the electricity storage devices, and a charge rate management charge and discharge instruction calculator for correcting the change relief charge and discharge instruction calculated by the charge and discharge power calculator on the basis of the charge rate target value calculated by the charge rate target value calculator and the charge rate detection value detected by the charge rate calculator and calculating the correction value of the charge and discharge power instruction for instructing each electricity storage device, and the converters are structured so as to control the charge and discharge power of the secondary batteries so as to follow the charge and discharge power instruction instructed from the control unit and to relieve the change of the combined power formed by adding the power outputted from the power generation system and the charge and discharge power outputted from the power storage apparatus, and the control unit includes a deterioration index calculator for calculating the correction value of the charge rate target value of the power storage apparatus according to the characteristics or operation history of the plurality of secondary batteries composing the electricity storage devices and instructing the charge rate target value calculator.

Further, a power storage apparatus of a power generation system of the present invention is a power storage apparatus installed in connection with the power generation system using natural energy the generation power of which changes with time for relieving the generation power change of the power generation system by executing charge and discharge, wherein the power storage apparatus is composed of a control unit and a plurality of electricity storage devices, and the plurality of electricity storage devices are composed of converters and secondary batteries, and the control unit includes a power station output target value calculator for calculating the target value of the power station output, a charge and discharge power calculator for calculating a change relief charge and discharge instruction to be charged and discharged by each of the plurality of electricity storage devices on the basis of the target value of the power station output calculated by the power station output target value calculator, an external input device for inputting the charge rate target value of the plurality of electricity storage devices from the outside, a charge rate calculator for calculating the charge rate of the secondary batteries composing the plurality of electricity storage devices, and a calculator for correcting the change relief charge and discharge instruction calculated by the charge and discharge power calculator on the basis of the charge rate target value inputted from the external input device and the charge rate detection value detected by the charge rate calculator and calculating the correction value of the charge and discharge power instruction for instructing each electricity storage device.

An operating method of a power storage apparatus of a power generation system of the present invention is an operating method of a power storage apparatus installed in connection with the power generation system using natural energy the generation power of which changes with time for relieving the generation power change of the power generation system by executing charge and discharge, wherein the power storage apparatus is composed of a control unit and a plurality of electricity storage devices and the plurality of electricity storage devices are composed of converters and secondary batteries detects the charge rate of the secondary batteries of the electricity storage devices by the charge rate calculator included in the control unit, calculates the target value of the power station output by the power station output target value calculators included in the control unit, calculates and outputs a charge and discharge power instruction to be charged and discharged by each of the plurality of electricity storage devices on the basis of the target value of the power station output calculated by the power station output target value calculator by the charge and discharge power calculator, calculates the correction value of the charge and discharge power instruction calculated by the charge and discharge power calculator by the charge rate management charge and discharge instruction calculator included in the control unit on the basis of the charge rate detection value of the secondary batteries of the electricity storage devices detected by the charge rate calculator and the charge rate target value calculated by the charge rate target value calculator, calculates the correction value of the charge rate target value of the power storage apparatus by the deterioration index calculator included in the control unit according to the characteristics or operation history of the secondary batteries composing the electricity storage devices, instructs the charge rate target value calculator, controls the charge and discharge power of the secondary batteries by the converters so as to follow the charge and discharge power instruction instructed from the control unit, relieves the change of the combined power formed by adding the power outputted from the power generation system and the charge and discharge power outputted from the power storage apparatus, thereby operating the power storage apparatus of the power generation system.

Further, an operating method of a power storage apparatus of a power generation system of the present invention, that is, the operating method of the power storage apparatus of the power generation system wherein the power storage apparatus installed in connection with the power generation system using natural energy the generation power of which changes with time for relieving the generation power change of the power generation system by executing charge and discharge is composed of a control unit and a plurality of electricity storage devices, and the plurality of electricity storage devices are composed of converters and secondary batteries, and by charging and discharging by the power storage apparatus, the change of the combined power outputted by the power generation system and power storage apparatus is relieved calculates the target value of the power station output by the power station output target value calculators included in the control unit, calculates a change relief charge and discharge instruction to be charged and discharged by each of the plurality of electricity storage devices by the charge and discharge power calculator included in the control unit on the basis of the target value of the power station output calculated by the power station output target value calculator, inputs the charge rate target value of the plurality of electricity storage devices from the outside by the external input device included in the control unit, calculates the charge rate of the secondary batteries composing the electricity storage devices by the charge rate calculator included in the control unit, corrects the change relief charge and discharge instruction calculated by the charge and discharge power calculator by the calculator included in the control unit on the basis of the charge rate target value inputted from the external input device and the charge rate detection value detected by the charge rate calculator, calculates the correction value of the charge and discharge power instruction, instructs the correction value of the charge and discharge power instruction to each electricity storage device, thereby operating the power storage apparatus of the power generation system.

Effects of the Invention

According to the present invention, a power storage apparatus of a power generation system for enabling extension of the overall operation period of the power storage apparatus having electricity storage devices for delaying further progress of deterioration of deterioration-progressed secondary batteries among a plurality of secondary batteries composing the electricity storage devices, thereby including both deterioration-progressed secondary batteries and deterioration-unprogressed secondary batteries and an operating method of the power storage apparatus of the power generation system can be realized.

BRIEF DESCRIPTION OF DRAWINGS

FIG. 17 is a flow chart showing the steps of inferring the deterioration condition of the second batteries of the electricity storage devices of the power storage apparatus of the second embodiment shown in FIG. 15 from the chargeable capacity.

DESCRIPTION OF THE EMBODIMENTS FOR CARRYING OUT THE INVENTION

The power storage apparatus, which is an embodiment of the present invention, installed in connection with the power generation system using natural energy the generation power of which changes with time and the operating method of the power storage apparatus will be explained with reference to FIGS. 1 to 14.

Embodiment 1

Figure 1:
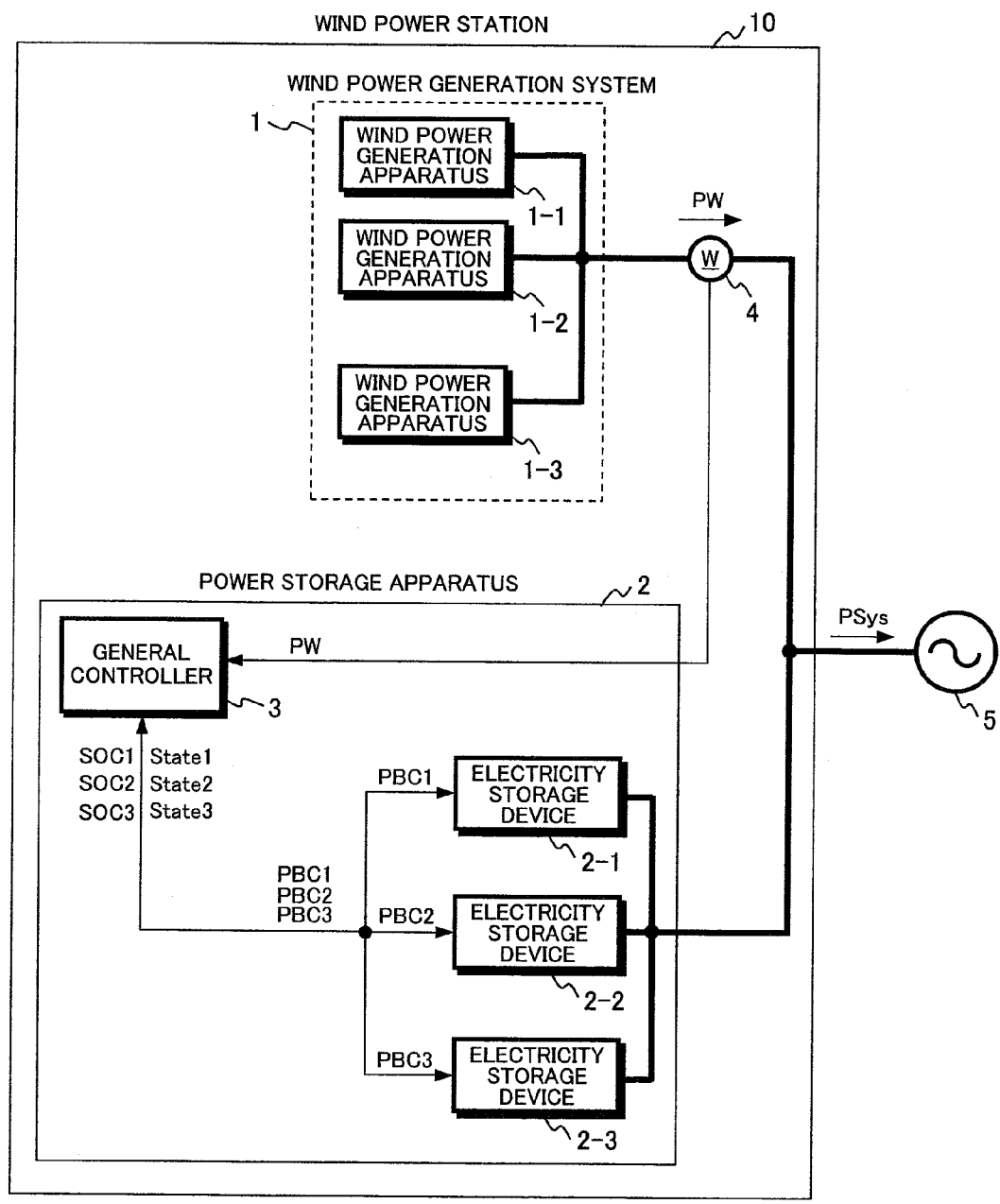
FIG. 1 is a schematic block diagram showing the constitution of the wind power station including the power generation system and power storage apparatus of the first embodiment of the present invention.

FIG. 1 shows an embodiment showing the constitution of a wind power station 10 including a power generation system 1 using natural energy the generation power of which changes with time and a power storage apparatus 2 installed in connection with the power generation system 1.

The wind power station 10 of the first embodiment shown in FIG. 1 is composed of the wind power generation system 1 and the power storage apparatus 2 installed in connection with the power generation system 1.

The power generation system 1 is the power generation system 1 composed by the wind power generation apparatus using natural energy the generation power of which changes with time and the wind power generation system 1 and the power storage apparatus 2 installed in connection with the power generation system 1 are electrically connected to a power system 5 via a transmission line and are structured so as to transmit the generation power generated by the wind power generation system 1 and the storage power stored in the power storage apparatus 2 to the power system 5.

The wind power generation system 1 is composed of one or more of wind power generation apparatuses 1-1, 1-2, and 1-3 and the embodiment in FIG. 1 shows an example including three wind power generation apparatuses.

The power storage apparatus 2 included in the wind power station 10 is composed of a general controller 3 and two or more of electricity storage devices 2-1, 2-2, and 2-3. If two or more electricity storage devices composing the power storage apparatus 2 are installed, they can produce the same effect as that of this embodiment.

The generation power generated by the wind power generation apparatuses 1-1, 1-2, and 1-3 of the wind power generation system 1 is measured by a wattmeter 4 as a generation power value PW and the generation power values PW measured by the wattmeter 4 are input to the general controller 3 included in the power storage apparatus 2. Further, the general controller 3 receives condition quantities State1, State2, and State3 of the electricity storage devices 2-1, 2-2, and 2-3 installed in the power storage apparatus 2.

A concrete example of the condition quantities State1, State2, and State3 of the electricity storage devices 2-1, 2-2, and 2-3 will be explained in detail in the text.

The general controller 3, on the basis of the input generation power values PW and the condition quantities State1, State2, and State3 of the power storage apparatus 2, calculates charge and discharge power instructions PBC1, PBC2, and PBC3 for instructing the power storage apparatus 2 in order to relieve the change in the generation power values PW and transmits them to the electricity storage devices 2-1, 2-2, and 2-3.

The electricity storage devices 2-1, 2-2, and 2-3 charge and discharge according to the charge and discharge power instructions PBC1, PBC2, and PBC3 transmitted from the general controller 3, thereby relieving the output power change of the wind power station 10.

The wind power generation apparatus composing the wind power generation system 1 included in the wind power station 10 of the first embodiment shown in FIG. 1 will be explained in detail below by referring to FIG. 2.

Figure 2:
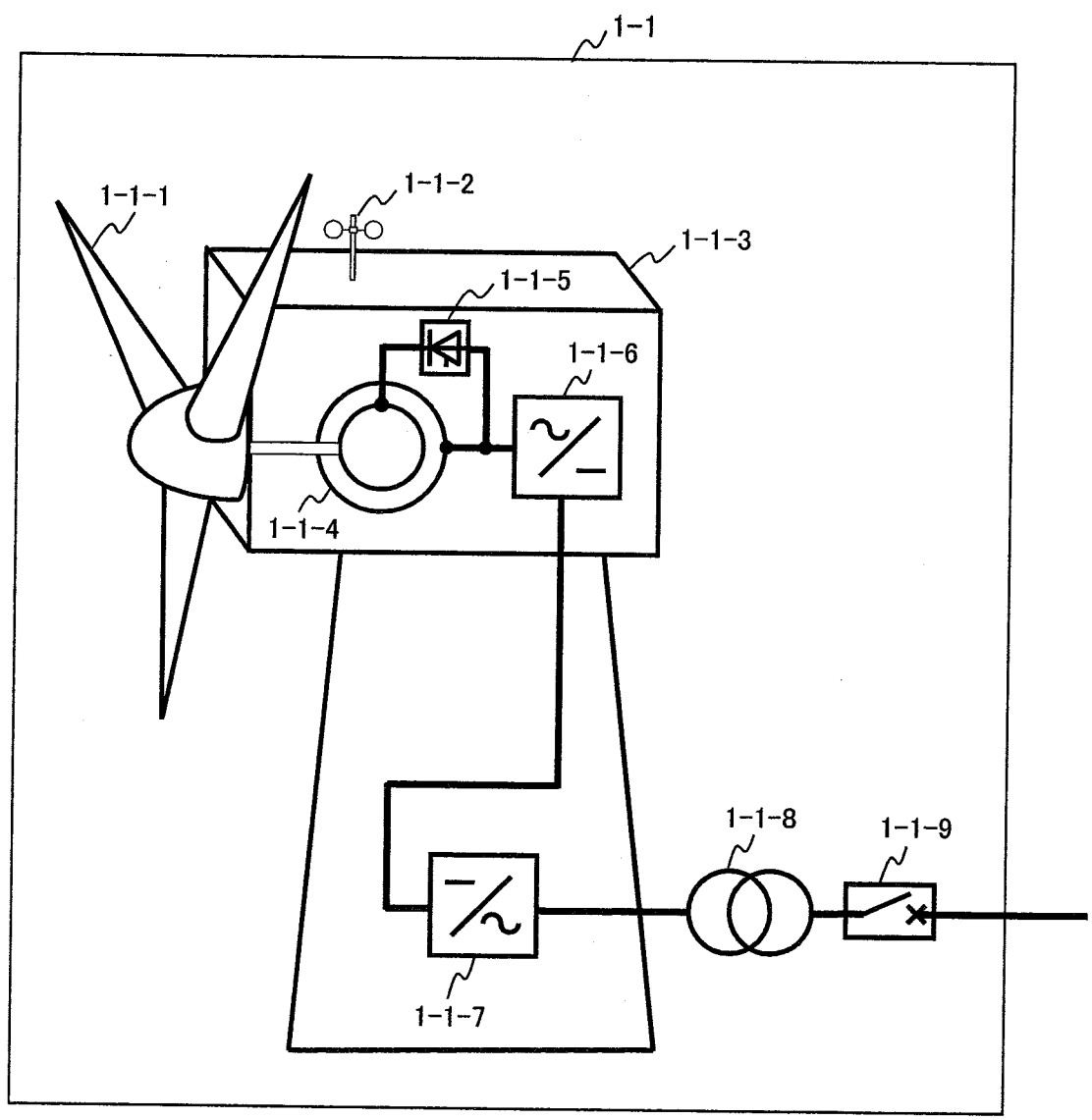
FIG. 2 is a schematic block diagram showing the wind power generation apparatus composing the power generation system of the wind power station of the first embodiment shown in FIG. 1.

In FIG. 2, the wind power generation apparatus 1-1 composing the wind power generation system 1 is composed of a nacelle 1-1-3 including blades 1-1-1, a generator 1-1-4, an exciter 1-1-5, a converter 1-1-6, a converter 1-1-7, a linkage transformer 1-1-8, and a circuit breaker 1-1-9.

And, the blades 1-1-1 receive wind and convert the wind energy to rotation energy. The rotation energy for rotating the blades 1-1-1 is transferred to the generator 1-1-4. The wind power generation apparatus 1-1 shown in FIG. 2 uses a DC excitation synchronous generator 1-1-4 as a generator 1-1-4.

The stator terminal of the DC excitation synchronous generator 1-1-4 is connected to the power system via the AC-DC converter 1-1-6, converter 1-1-7, linkage transformer 1-1-8, and circuit breaker 1-1-9.

Further, the rotor of the DC excitation synchronous generator 1-1-4 is connected to the stator via the exciter 1-1-5 and controls the AC-DC converter 1-1-6 and exciter 1-1-5 to realize the variable speed operation.

Further, in addition to the wind power generation apparatus 1-1 shown in FIG. 2, there is a wind power generation apparatus using a permanent magnet generator and a wind power generation system using an induction machine available, though even if the wind power generation apparatuses 1-1, 1-2, and 1-3 are composed of those wind power generation apparatuses or a combination of those wind power generation apparatuses, the same effect as that of this embodiment can be obtained.

Next, the electricity storage devices 2-1, 2-2, and 2-3 composing the power storage apparatus 2 included in the wind power station 10 of the first embodiment shown in FIG. 1 will be explained in detail by referring to FIG. 3.

Figure 3:
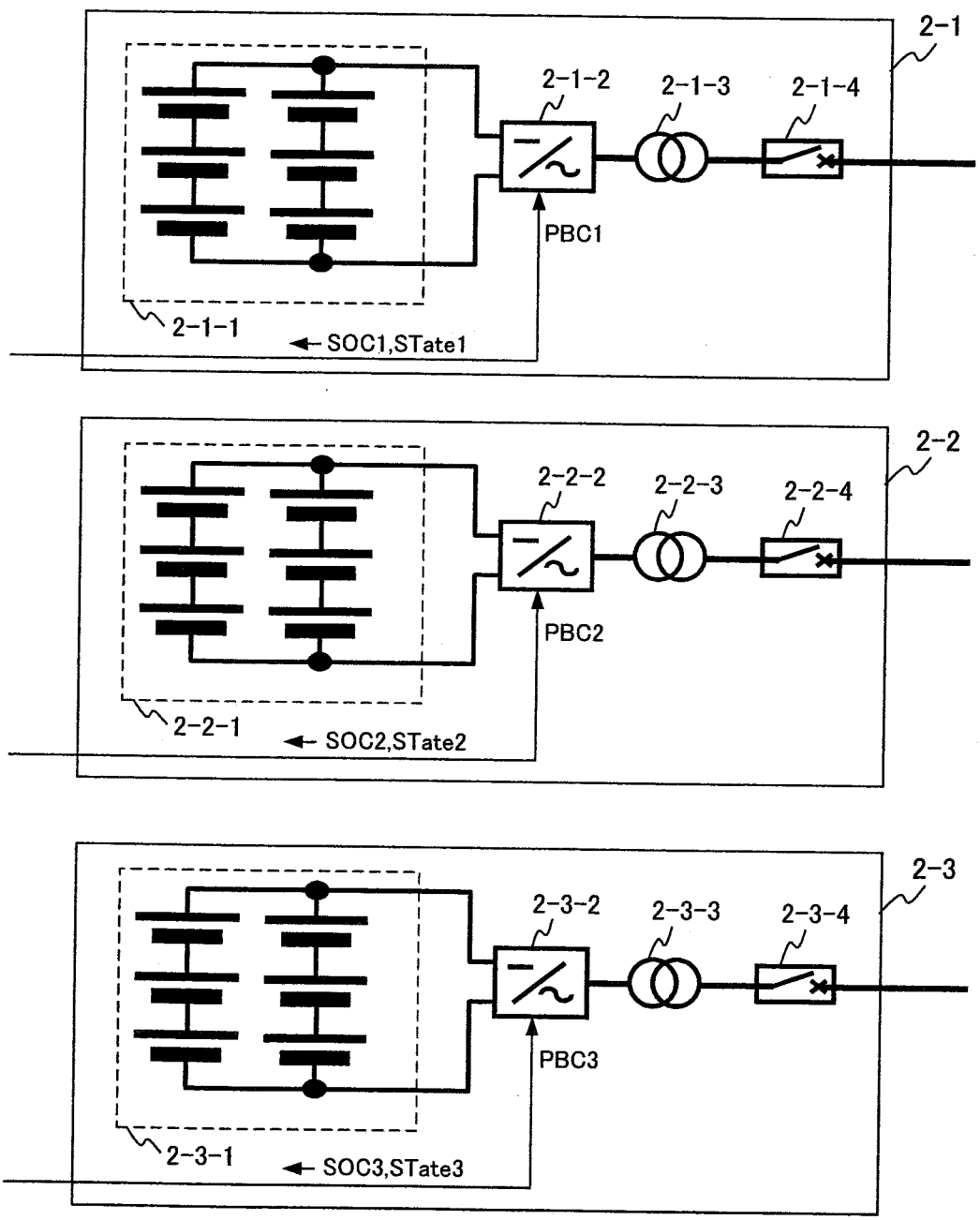
FIG. 3 is a schematic block diagram showing the electricity storage devices composing the power storage apparatus of the wind power station of the first embodiment shown in FIG. 1.

In FIG. 3, the electricity storage device 2-1 composing the power storage apparatus 2 is composed of a lead-acid battery 2-1-1, a converter 2-1-2, a linkage transformer 2-1-3, and a circuit breaker 2-1-4. The lead-acid battery 2-1-1 is composed of a series connection and parallel connection of a plurality of lead-acid battery unit cells. The terminal of the lead-acid battery 2-1-1 is electrically connected to the DC portion of the converter 2-1-2.

The converter 2-1-2 controls the charge and discharge power of the lead-acid battery 2-1-1 according to the charge and discharge power instruction PBC1 outputted from the general controller 3 shown in FIG. 1. The converter 2-1-2 has a function for detecting the charge rate (SOC1) of the lead-acid battery 2-1-1 and the condition quantities State1 such as the charge and discharge current and terminal voltage and transmits the condition quantities to the general controller. Further, a charge and discharge current I of the lead-acid battery 2-1-1, although not drawn, is detected by the current detector composing the electricity storage device 2-1.

Further, the terminal voltage of the lead-acid battery 2-1-1, although not drawn, is detected by the DC voltage detector composing the electricity storage device 2-1. Further, the charge rate SOC1 of the lead-acid battery 2-1-1 is calculated from the charge and discharge current I of the lead-acid battery 2-1-1 according to Formula (1).

$$SOC1 = SOC(t=0) - (\int Idt) \div (\text{rated capacity of storage battery}) \quad (1)$$

where SOC (t=0) in Formula (1) indicates an initial SOC condition and for the charge and discharge current I, the discharge side is handled as positive and the charge side is handled as negative.

Here, the constitution of the other electricity storage devices 2-2 and 2-3 composing the power storage apparatus 2 is the same as that of the electricity storage device 2-1 shown in FIG. 3, so that a detailed explanation will be omitted.

Next, the constitution of the general controller 3 installed in the power storage apparatus 2 composing the wind power station 10 of the first embodiment and the operation thereof will be explained by referring to FIG. 1 and FIGS. 4 to 14.

The general controller 3 is composed of a microprocessor and others and plays roles of detecting the condition quantities of the wind power generation system 1 and power storage apparatus 2 and calculating the charge and discharge power instructions PBC1, PBC2, and PBC3 to be charged and discharged by the electricity storage devices 2-1, 2-2, and 2-3 of the power storage apparatus 2. Hereinafter, a concrete operation of the general controller 3 will be explained in detail.

Figure 4:
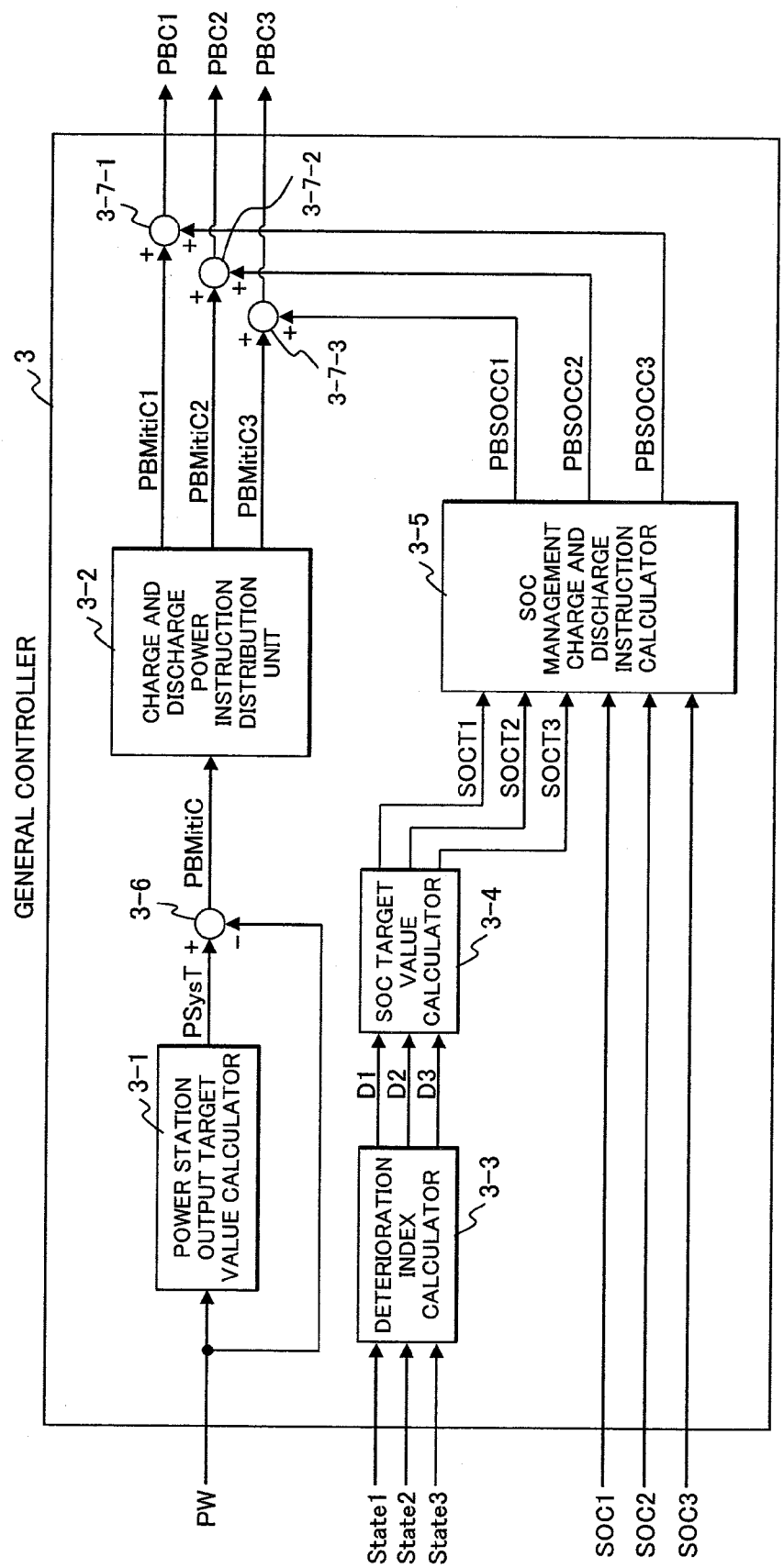
FIG. 4 is a schematic block diagram showing the general controller installed in the power storage apparatus of the wind power station of the first embodiment shown in FIG. 1.

In FIGS. 1 and 4, the general controller 3, from the generation power values PW of the wind power generation system 1 measured by the wattmeter 4, calculates a target value PSysT of the power station output to be outputted by the power station by a power station output target value calculator 3-1 composing the general controller 3.

The target value PSysT of the power station output calculated by the power station output target value calculator 3-1 decides the generation power value PW of the wind power generation system 1 as a relieved value with the change with time of the generation power value PW.

An example of the concrete operation of the power station output target value calculator 3-1 composing the general controller 3 will be explained by referring to FIG. 5.

Figure 5:
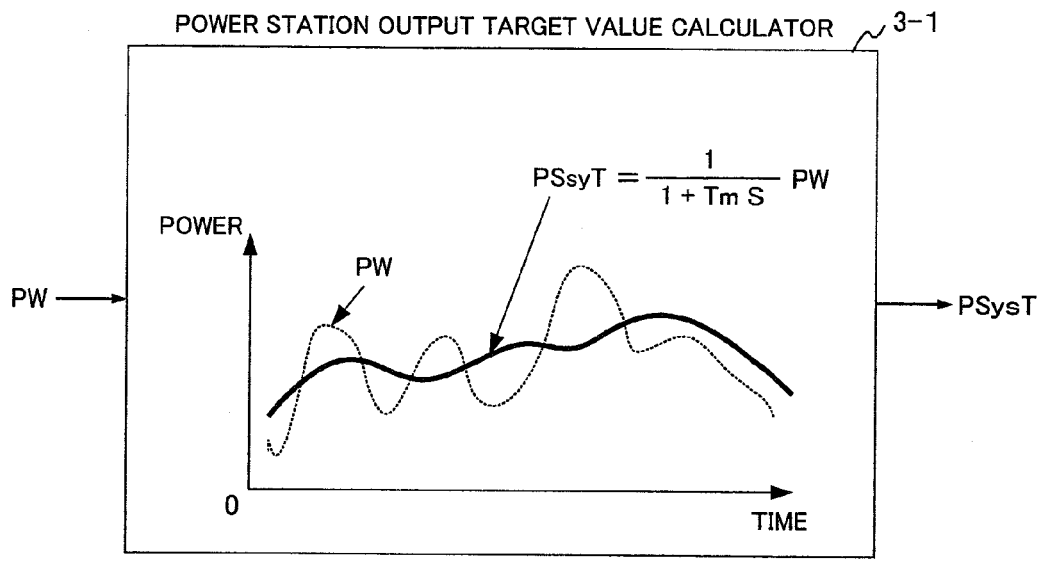
FIG. 5 is a schematic block diagram showing the power station output target value calculator for calculating the output target value of the power station installed in the general controller of the power storage apparatus shown in FIG. 4.

The power station output target value calculator 3-1 composing the general controller 3 shown in FIG. 5 executes a primary delay operation (or primary delay filtering) for the generation power value PW of the wind power generation system 1, thereby calculating the power station output target value PSysT with the generation power value change averaged. Further, FIG. 5 shows an example that the primary delay constant is assumed as Tm.

Figure 6:
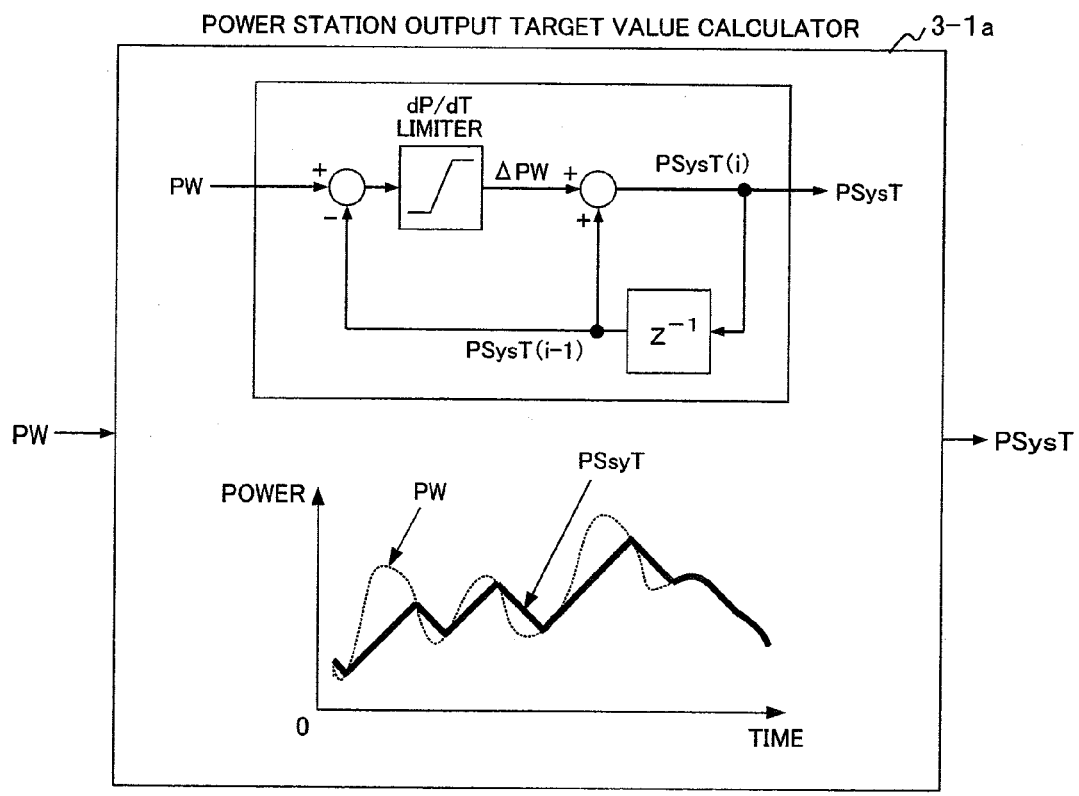
FIG. 6 is a schematic block diagram showing another concrete example of the power station output target value calculator of the general controller shown in FIG. 5.

Another constitution example of the power station output target value calculator 3-1 composing the general controller 3 is shown in FIG. 6.

A power station output target value calculator 3-1*a* composing the general controller 3 shown in FIG. 6 limits the change rate (dP/dT) with time of the generation power value PW of the wind power generation system 1 to a predetermined value or smaller, thereby deciding the power station output target value PSysT.

Figure 7:
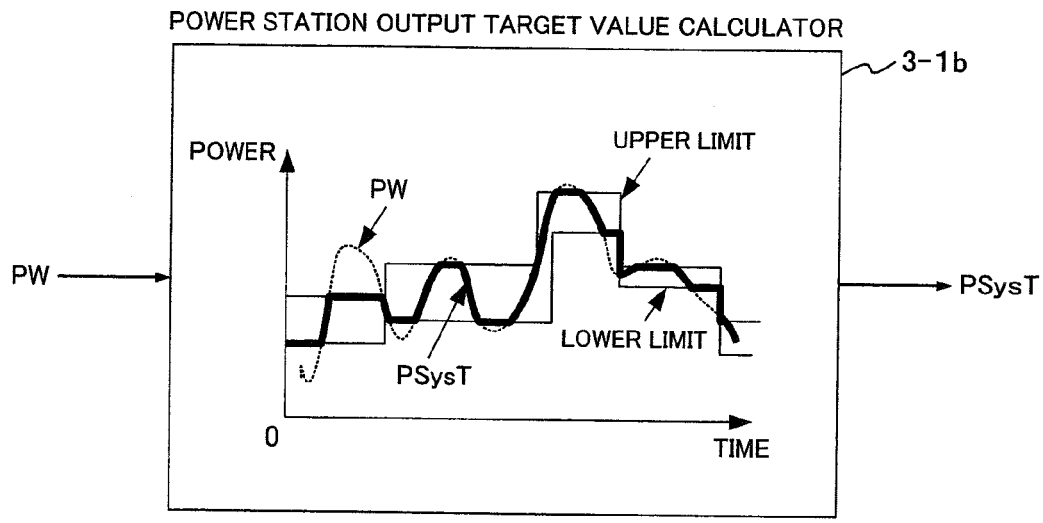
FIG. 7 is a schematic block diagram showing still another concrete example of the power station output target value calculator of the general controller shown in FIG. 5.

Further, still another constitution example of the power station output target value calculator 3-1 composing the general controller 3 is shown in FIG. 7.

A power station output target value calculator 3-1*b* composing the general controller 3 shown in FIG. 7 sets an upper limit and a lower limit value which can be outputted for the generation power value PW of the wind power generation system 1 and calculates a value limited to the upper limit value and lower limit value as a power station output target value PSysT. Further, the calculation method of the upper limit value and lower limit value of the power station output target value calculator 3-1*b* can be realized by the system proposed previously by the inventors of the present invention (Japanese Patent Laid-open No. 2009-079559) and a detailed explanation will be omitted.

As a power station output target value calculator 3-1 composing the general controller 3 installed in the power storage apparatus 2 composing the wind power station 10 of the first embodiment aforementioned, for the calculation system of the power station output target value PSysT, the three constitution examples shown in FIGS. 5, 6, and 7 are cited, though in any of the calculation systems, the effect that the power station output target value PSysT with the change with time of the relieved generation power value PW of the wind power generation system 1 is calculated can be produced and by use of any of the methods, the effect of the present invention is produced.

Further, similarly, a means for calculating the power station output target value PSysT for relieving the change with time of the generation power value PW of the wind power generation system 1, even if it is a power station output target value calculation system other than the one shown in this embodiment, can produce the effect of the present invention.

Next, in the general controller 3 installed in the power storage apparatus 2, as shown in FIG. 4, to relieve the change of the power station output target value PSysT calculated by the power station output target value calculator 3-1, the generation power value PW of the wind power generation system 1 is subtracted from the power station output target value PSysT calculated by the power station output target value calculator 3-1 by a subtracter 3-6, thus a charge and discharge power instruction PBMitiC for change relief is decided.

The charge and discharge power instruction PBMitiC for change relief is a value expressing the charge and discharge power value to be charged and discharged by the power storage apparatus 2 to relieve the change of the generation power value PW of the wind power generation system 1.

A charge and discharge power instruction distribution unit 3-2 composing the general controller 3 distributes the charge and discharge power instruction PBMitiC for change relief calculated by the subtracter 3-6 as a charge and discharge power instruction to be charged and discharged by the electricity storage devices 2-1, 2-2, and 2-3.

Figure 8:
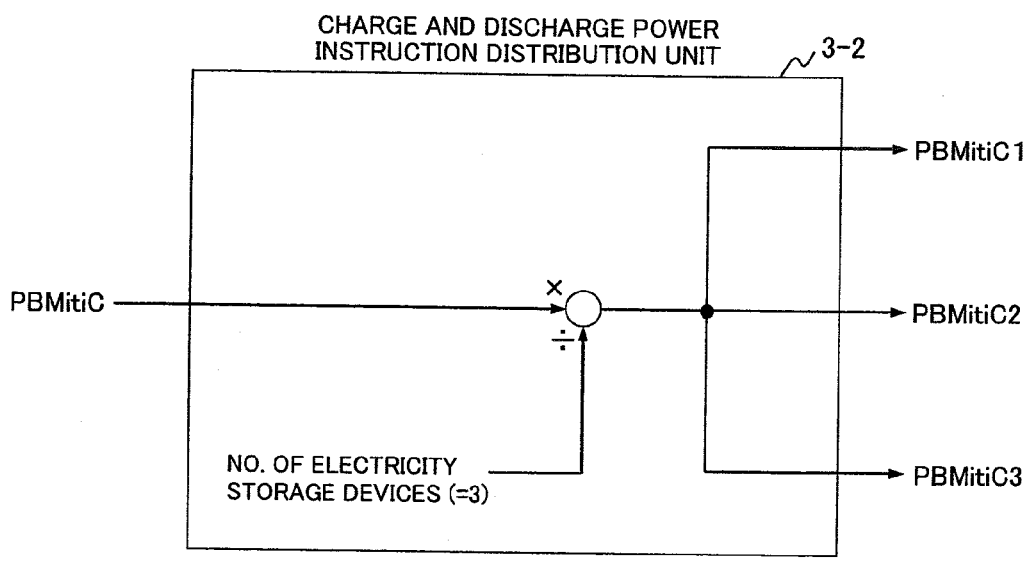
FIG. 8 is a schematic block diagram showing the charge and discharge power instruction distribution unit for calculating the charge and discharge power instruction installed in the general controller of the power storage apparatus shown in FIG. 4.

A concrete operation of the charge and discharge power instruction distribution unit 3-2 is shown in FIG. 8. As shown in FIG. 8, the charge and discharge power instruction distribution unit 3-2 distributes the charge and discharge power instruction PBMitiC calculated by the subtracter 3-6 on average to the electricity storage devices 2-1, 2-2, and 2-3.

In the power storage apparatus 2 composing the wind power station 10 of the first embodiment shown in FIGS. 1, 4, and 8, the case that the power storage apparatus 2 is composed of three electricity storage devices 2-1, 2-2, and 2-3 is supposed, so that the charge and discharge power instruction distribution unit 3-2 divides the charge and discharge power instruction PBMitiC by three, thereby deciding charge and discharge power instructions PBMitiC1, PBMitiC2, and PBMitiC3 for change relief of the electricity storage devices 2-1, 2-2, and 2-3.

To relieve the change with time of the generation power value PW of the wind power generation system 1 installed in the wind power station 10 of the first embodiment by the electricity storage devices explained so far, the charge and discharge power value to be charged and discharged by the power storage apparatus 2 installed in the wind power station 10 is decided.

On the other hand, the power storage apparatus 2 installed in connection with the power generation system 1 of the first embodiment executes charge and discharge to relieve the change with time of the generation power value PW of the wind power generation system 1 and furthermore, to prevent the electricity storage devices 2-1, 2-2, and 2-3 composing the power storage apparatus 2 from deterioration, additionally executes charge and discharge for controlling the charge rate (hereinafter, referred to as SOC) for the purpose of deterioration suppression of the electricity storage devices 2-1, 2-2, and 2-3. Hereinafter, the charge and discharge method of the electricity storage devices 2-1, 2-2, and 2-3 for SOC control will be explained in detail.

Firstly, a concrete operation of a deterioration index calculator 3-3 composing the general controller 3 shown in FIG. 4 will be explained. The deterioration index calculator 3-3, on the basis of the condition quantities State1, State2, and State3 of the electricity storage devices 2-1, 2-2, and 2-3 received from the electricity storage devices 2-1, 2-2, and 2-3 of the power storage apparatus 2, calculates deterioration degree indexes D1, D2, and D3 indicating the deterioration degree of the lead-acid batteries 2-1-1, 2-2-1, and 2-3-1 composing the electricity storage devices 2-1, 2-2, and 2-3.

Figure 9:
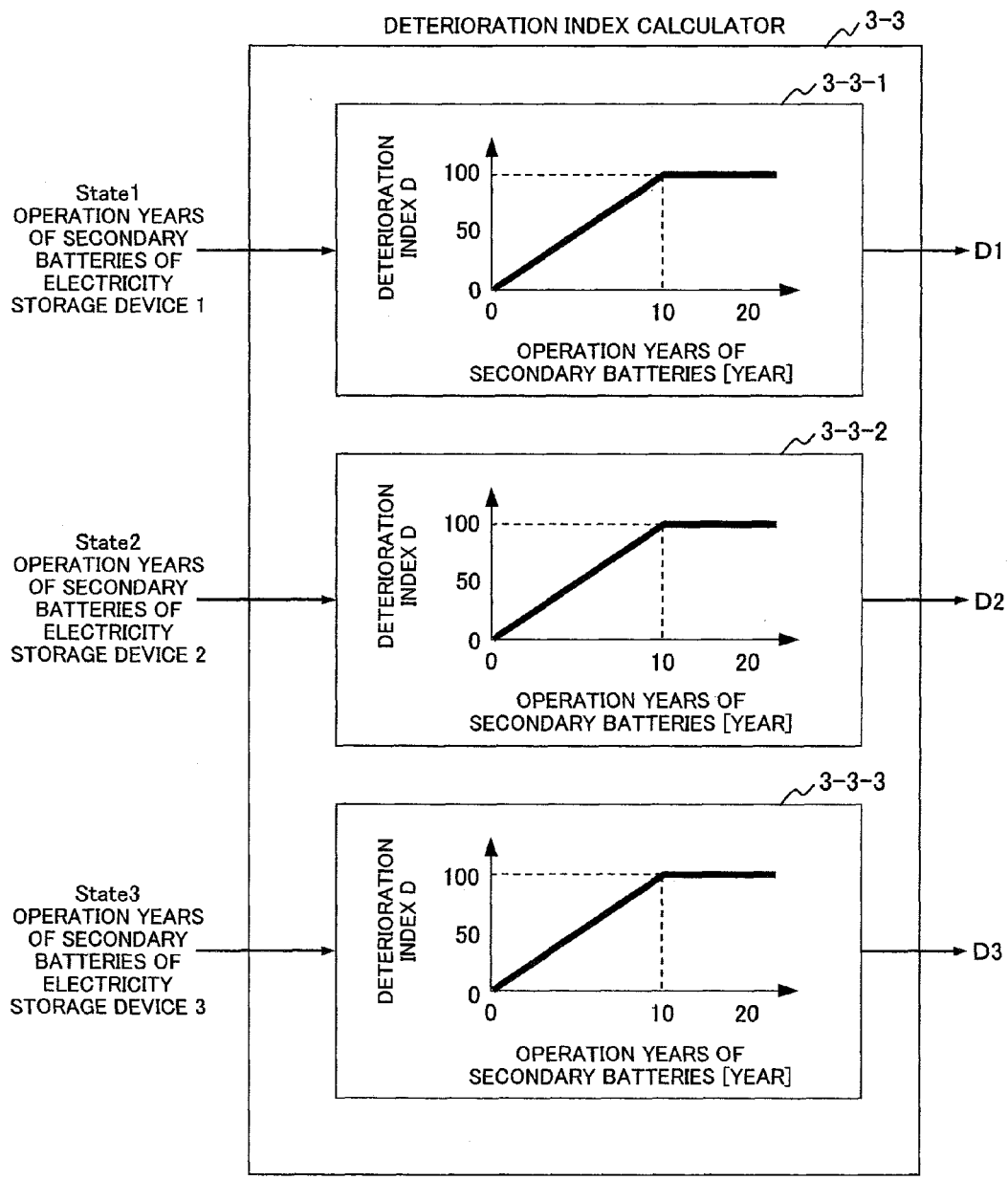
FIG. 9 is a schematic block diagram showing the deterioration index calculator for calculating the deterioration index of the electricity storage devices installed in the general controller of the power storage apparatus shown in FIG. 4.

A concrete constitution of the deterioration index calculator 3-3 is shown in detail in FIG. 9. The deterioration index calculator 3-3 with the detailed constitution thereof shown in FIG. 9 receives the secondary battery operation years from installation of the secondary battery (lead-acid battery) as the condition quantities State1, State2, and State3 from the electricity storage devices 2-1, 2-2, and 2-3 shown in FIG. 1.

The deterioration index calculator 3-3 internally preserves year-deterioration index corresponding maps 3-3-1, 3-3-2, and 3-3-3 for making the secondary battery operation years correspond to the deterioration index D as data and selects and outputs the corresponding deterioration indexes D1, D2, and D3 from the secondary battery operation years received from the year-deterioration index corresponding maps 3-3-1, 3-3-2, and 3-3-3. Further, the deterioration indexes D1, D2, and D3 indicate numerical values 0 to 100.

When the deterioration index D is 0, it indicates the condition that the deterioration does not progress at all and when it is 100, it indicates that the deterioration progresses and the lead-acid battery cannot be operated (the battery life has expired). In the lead-acid battery, as the operation period is extended, the deterioration (sulfation) progresses, so that if the operation period is longer, the corresponding deterioration index is set larger.

Figure 10:
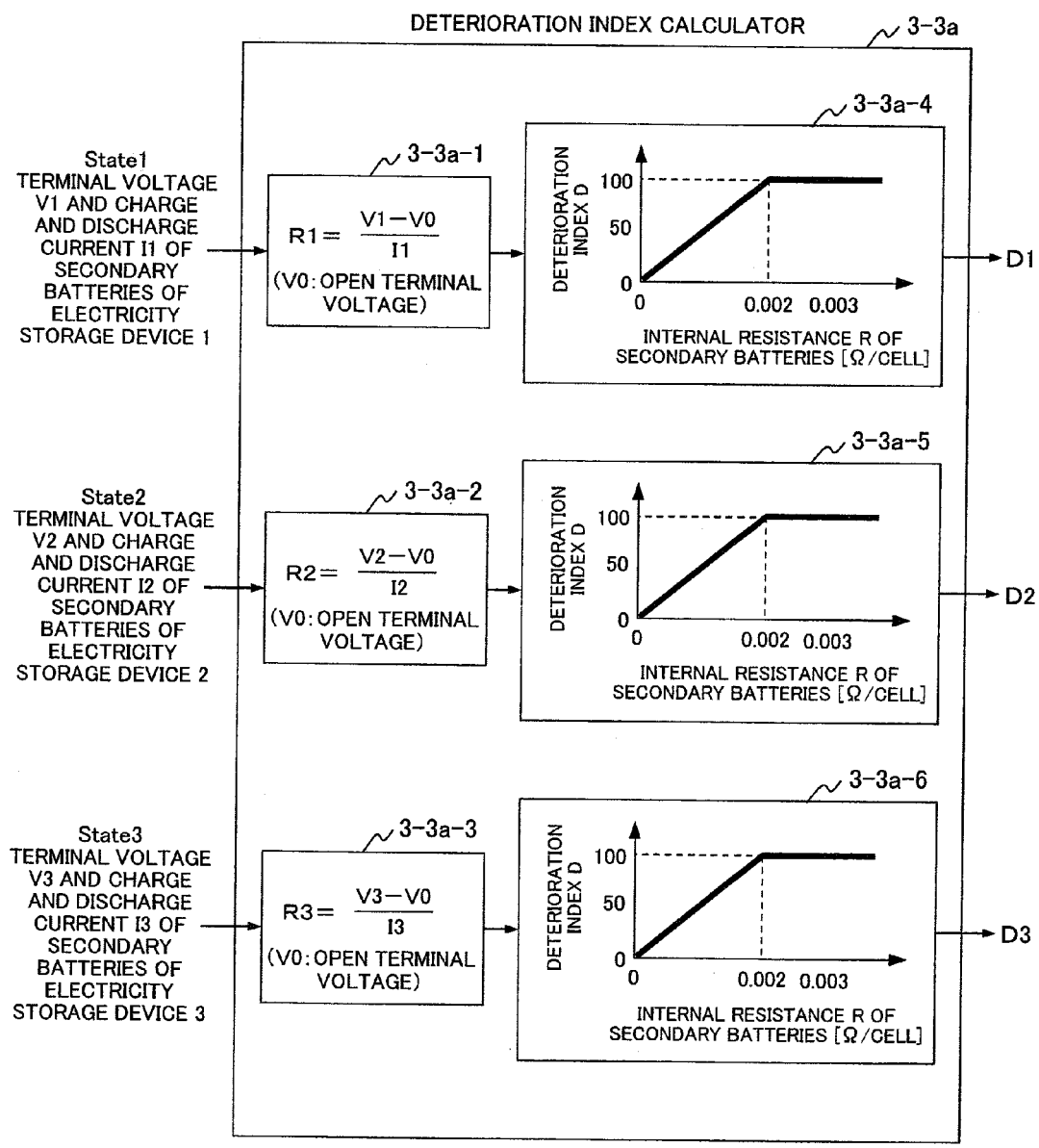
FIG. 10 is a schematic block diagram showing another concrete example of the deterioration index calculator for calculating the deterioration index of the electricity storage devices installed in the general controller of the power storage apparatus shown in FIG. 4.

A deterioration index calculator 3-3a having another constitution of the deterioration index calculator 3-3 composing the general controller 3 shown in FIG. 4 is shown in FIG. 10. The deterioration index calculator 3-3a shown in FIG. 10 is structured so as to use terminal voltages V1, V2, and V3 and charge and discharge currents I1, I2, and I3 of the secondary batteries (lead-acid batteries) received from the electricity storage devices 2-1, 2-2, and 2-3 of the power storage apparatus 2 as the condition quantities State1, State2, and State3.

The condition quantities State1, State2, and State3 include the terminal voltages V1, V2, and V3 and the charge and discharge currents I1, I2, and I3.

In the deterioration index calculator 3-3a, internal resistance-deterioration index corresponding maps 3-3a-4, 3-3a-5, and 3-3a-6 for making internal resistance calculators 3-3a-1, 3-3a-2, 3-3a-3 for calculating internal resistances R1, R2, and R3 of the lead-acid batteries 2-1-1, 2-2-1, and 2-3-1 correspond to the deterioration indexes are installed.

The internal resistance calculators 3-3a-1, 3-3a-2, 3-3a-3 installed in the deterioration index calculator 3-3a calculates the internal resistances R1, R2, and R3 of the lead-acid batteries 2-1-1, 2-2-1, and 2-3-1 from the terminal voltages V1, V2, and V3 and the charge and discharge currents I1, I2, and I3 included in the condition quantities State1, State2, and State3 which are received from the electricity storage devices 2-1, 2-2, and 2-3.

Concretely, according to the calculation formulas of Formulas (2), (3), and (4) included in the internal resistance calculators 3-3a-1, 3-3a-2, 3-3a-3, the internal resistances R1, R2, and R3 of the lead-acid batteries 2-1-1, 2-2-1, and 2-3-1 are calculated.

$$R1=(V1-V0)\div I1 \quad (2)$$

$$R2=(V2-V0)\div I2 \quad (3)$$

$$R3=(V3-V0)\div I3 \quad (4)$$

where V0 indicates a terminal voltage of the lead-acid battery when it is not deteriorated.

Next, in the internal resistance-deterioration index corresponding maps 3-3a-4, 3-3a-5, and 3-3a-6 installed in the deterioration index calculator 3-3a, on the basis of the characteristic line segment deciding the relation between the internal resistance R and the deterioration index D shown in FIG. 10, the deterioration indexes D1, D2, and D3 corresponding to the internal resistances R1, R2, and R3 calculated by the internal resistance calculators 3-3a-1, 3-3a-2, 3-3a-3 are selected and outputted.

Further, if the deterioration (sulfation) of the lead-acid battery progresses, the internal resistance is apt to increase, so that as shown in the internal resistance-deterioration index corresponding maps 3-3a-4, 3-3a-5, and 3-3a-6, as the internal resistances R1, R2, and R3 increase, the deterioration indexes D1, D2, and D3 are set so as to increase.

In the general controller 3 of the power storage apparatus 2 installed in connection with the wind power generation system 1 of this embodiment, as the deterioration index calculator 3-3, the two systems of the constitution of the deterioration index calculator 3-3 shown in FIG. 9 and the constitution of the deterioration index calculator 3-3a shown in FIG. 10 are explained, though even if the constitution of the deterioration index calculator 3-3 of either of the systems is used, the effect of the present invention can be produced.

Further, although not drawn, as a deterioration inferring means, the cumulative integration quantity of the discharge current of the secondary battery is calculated and as the cumulative discharge current integration quantity increases, it may be inferred that the deterioration progresses. The reason is that as the discharge current quantity increases, the deterioration of the lead-acid battery progresses.

Next, a concrete operation of an SOC target value calculator 3-4 composing the general controller 3 shown in FIG. 4 will be explained by referring to FIG. 11.

Figure 11:
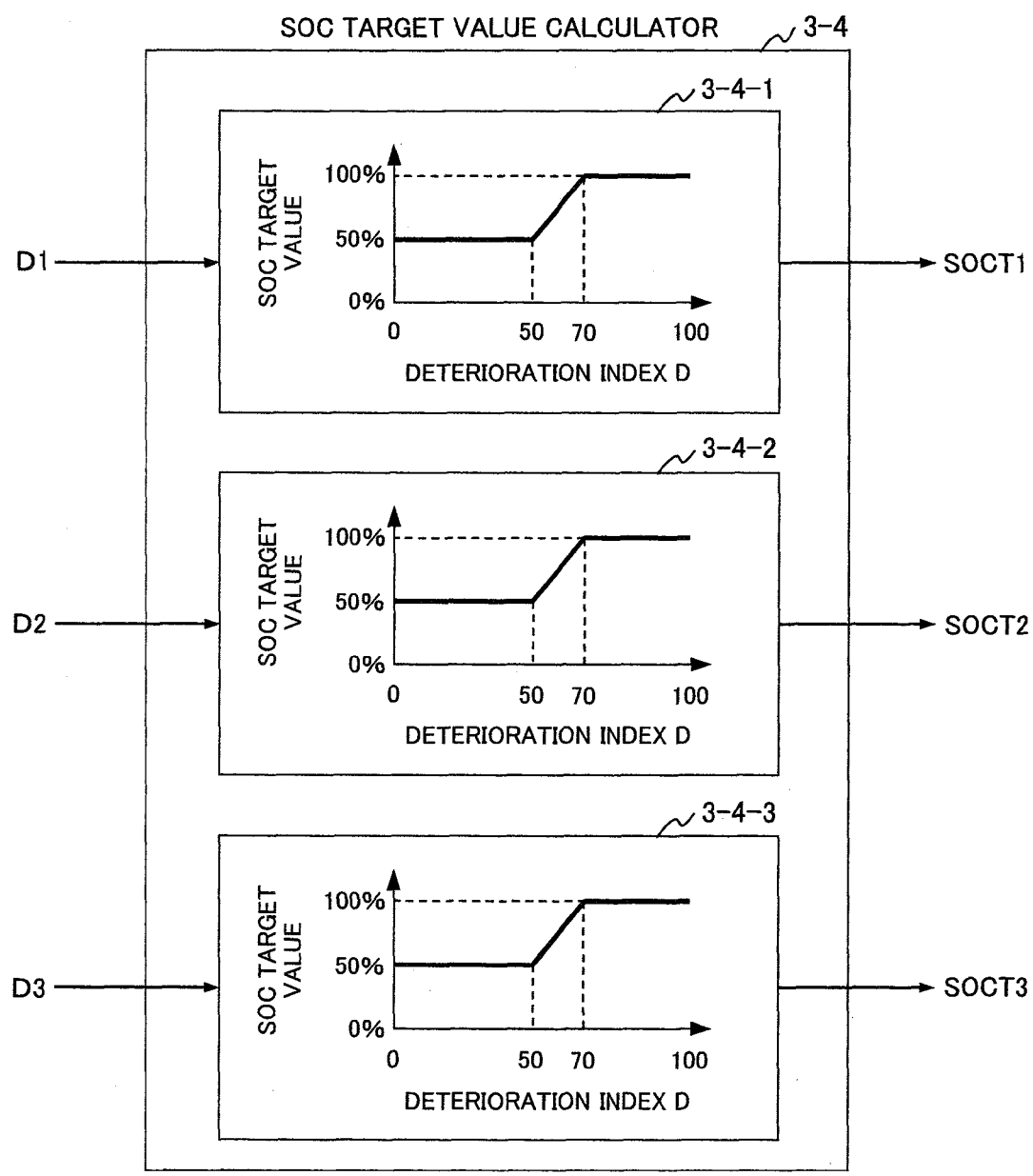
FIG. 11 is a schematic block diagram showing the SOC target value calculator for calculating the SOC target value of the electricity storage devices installed in the general controller of the power storage apparatus shown in FIG. 4.

In FIG. 11, in the SOC target value calculator 3-4, according to the deterioration degrees D1, D2, and D3 of the lead-acid batteries 2-1-1, 2-2-1, and 2-3-1 which are outputted from the internal resistance-deterioration index corresponding maps 3-3a-4, 3-3a-5, and 3-3a-6 which are installed in the deterioration index calculator 3-3, deterioration degree-SOC target value corresponding maps 3-4-1, 3-4-2, and 3-4-3 for calculating and outputting charge rate target values (SOC target values) SOCT1, SOCT2, and SOCT3 are installed.

Further, in the deterioration degree-SOC target value corresponding maps 3-4-1, 3-4-2, and 3-4-3 installed in the SOC target value calculator 3-4 of this embodiment, the fully charged condition of the lead-acid battery is defined as a 100% condition of the SOC, and the perfect discharge condition of the lead-acid battery is defined as a 0% condition of the SOC, and on the basis of the characteristic line segment deciding the relation between the SOC target value and the deterioration index D shown in FIG. 11, the SOC target values SOCT1, SOCT2, and SOCT3 corresponding to the deterioration degrees D1, D2, and D3 of the lead-acid batteries 2-1-1, 2-2-1, and 2-3-1 which are calculated and outputted by the deterioration index calculator 3-3 or the deterioration index calculator 3-3a are selected and outputted.

The deterioration (sulfation) of the lead-acid battery is prevented from progress as the battery approaches the full charge. Therefore, in the deterioration degree-SOC target value corresponding maps 3-4-1, 3-4-2, and 3-4-3, as the values of the deterioration degrees D1, D2, and D3 increase, the corresponding SOC target values are set so as to increase.

Next, a concrete operation of an SOC management charge and discharge instruction calculator 3-5 composing the general controller 3 shown in FIG. 4 will be explained by referring to FIG. 12.

Figure 12:
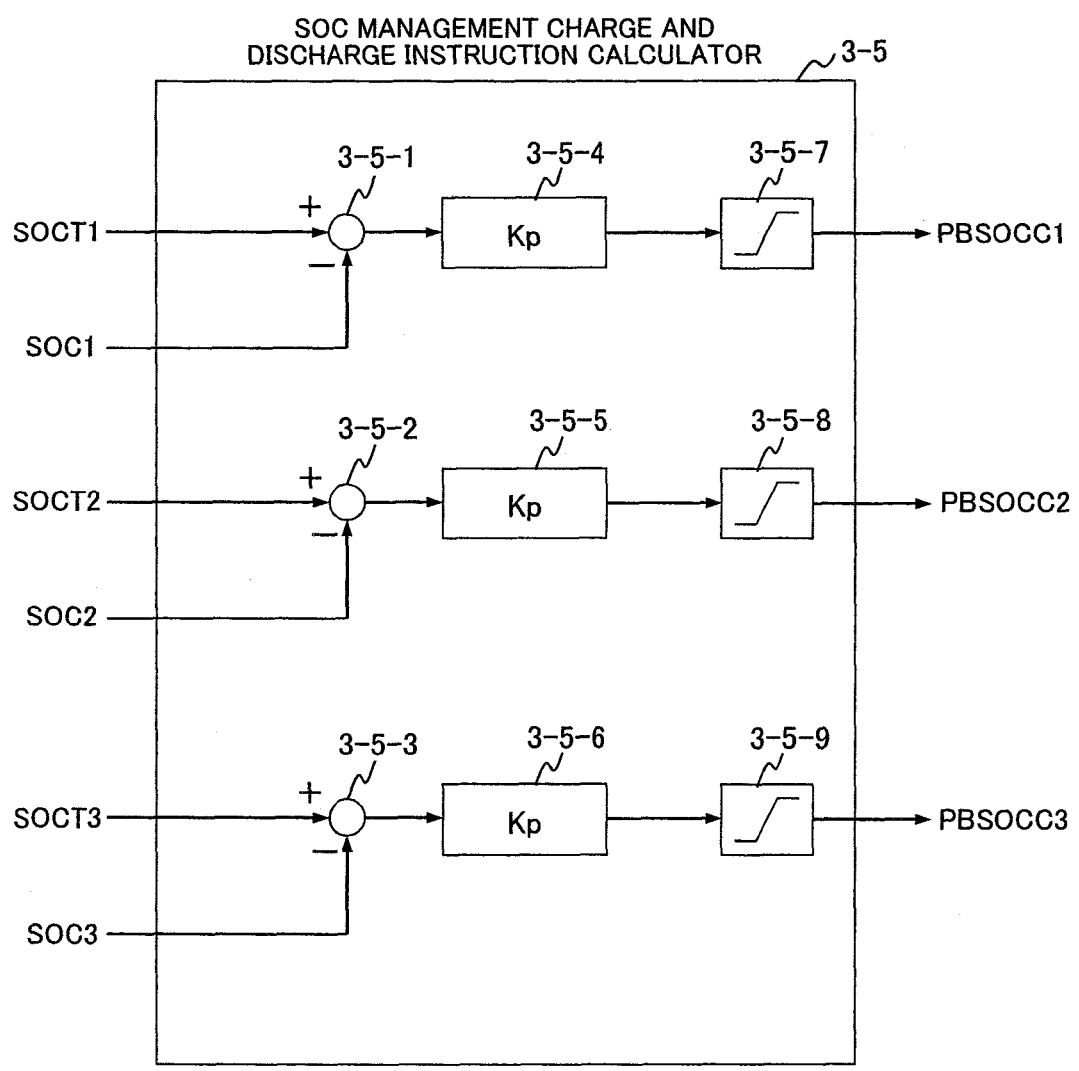
FIG. 12 is a schematic block diagram showing the SOC management charge and discharge power instruction calculator for calculating the charge and discharge power instruction of the electricity storage devices installed in the general controller of the power storage apparatus shown in FIG. 4.

In FIG. 12, the SOC management charge and discharge instruction calculator 3-5, on the basis of the SOC target values SOCT1, SOCT2, and SOCT3 of the electricity storage devices 2-1-1, 2-2-1, and 2-3-1 which are calculated and outputted in the deterioration degree-SOC target value corresponding maps 3-4-1, 3-4-2, and 3-4-3 which are installed in the SOC target value calculator 3-4 and the SOC measured values SOC1, SOC2, and SOC3 which are detected by the electricity storage devices 2-1-1, 2-2-1, and 2-3-1, calculates charge and discharge power instructions PBSOCC1, PBSOCC2, and PBSOCC3 for SOC management of the electricity storage devices 2-1-1, 2-2-1, and 2-3-1.

Concretely, subtracters 3-5-1, 3-5-2, and 3-5-3 installed in the SOC management charge and discharge instruction calculator 3-5 subtract respectively the SOC measured values SOC1, SOC2, and SOC3 from the SOC target values SOCT1, SOCT2, and SOCT3, and the subtracted values are proportionally calculated by proportional calculators 3-5-4, 3-5-5, and 3-5-6, and furthermore, the proportionally calculated values are limited by limiter calculators 3-5-7, 3-5-8, and 3-5-9, thus the charge and discharge power instructions PBSOCC1, PBSOCC2, and PBSOCC3 for SOC management are calculated and outputted.

The proportional calculators 3-5-4, 3-5-5, and 3-5-6 integrate a fixed value Kp to the difference between the SOC target values SOCT1, SOCT2, and SOCT3 outputted from the SOC target value calculator 3-4 and the SOC measured values SOC1, SOC2, and SOC3 which are detected by the electricity storage devices 2-1, 2-2, and 2-3, thereby for the electricity storage devices 2-1, 2-2, and 2-3 the difference between the target value and the measured value of which is large, calculate large charge and discharge power instructions (PBSOCC1, PBSOCC2, PBSOCC3).

The limiter calculators 3-5-7, 3-5-8, and 3-5-9, so as to permit the charge and discharge for SOC management not to influence the change relief effect, limits the charge and discharge power instructions PBSOCC1, PBSOCC2, and PBSOCC3 to less than a small value (for example, within ±1%) for the rated power of the wind power station 10.

The general controller 3 shown in FIG. 4 is structured so as to respectively add, using the means mentioned above, the charge and discharge power instructions PBMitiC1, PBMitiC2, and PBMitiC3 for change relief which are calculated by the charge and discharge power instruction distribution unit 3-2 and the charge and discharge power instructions PBSOCC1, PBSOCC2, and PBSOCC3 which are calculated by the SOC management charge and discharge instruction calculator 3-5 for SOC management by adders 3-7-1, 3-7-2, and 3-7-3 installed in the general controller 3, thereby deciding the charge and discharge power instructions PBC1, PBC2, and PBC3 to be charged and discharged by the electricity storage devices 2-1, 2-2, and 2-3, and instruct the electricity storage devices 2-1, 2-2, and 2-3.

The charge and discharge power instructions PBC1, PBC2, and PBC3 which are added and decided by the adders 3-7-1, 3-7-2, and 3-7-3 are transmitted to the electricity storage devices 2-1, 2-2, and 2-3 as an instruction value from the general controller 3.

Figure 13A:
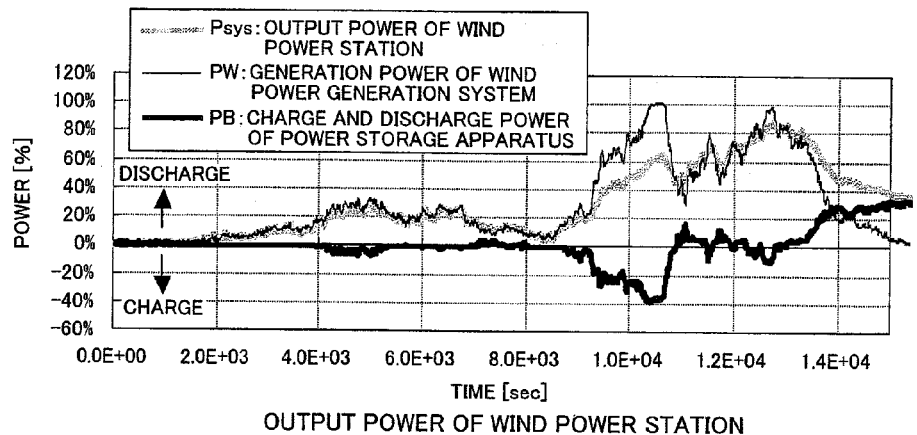
FIG. 13A is an operation condition diagram of the simulation of the case that the wind power station is operated by the general controller installed in the power storage apparatus of the wind power station of the first embodiment shown in FIG. 1, showing the change with time of the output power of the wind power station.
Figure 13B:
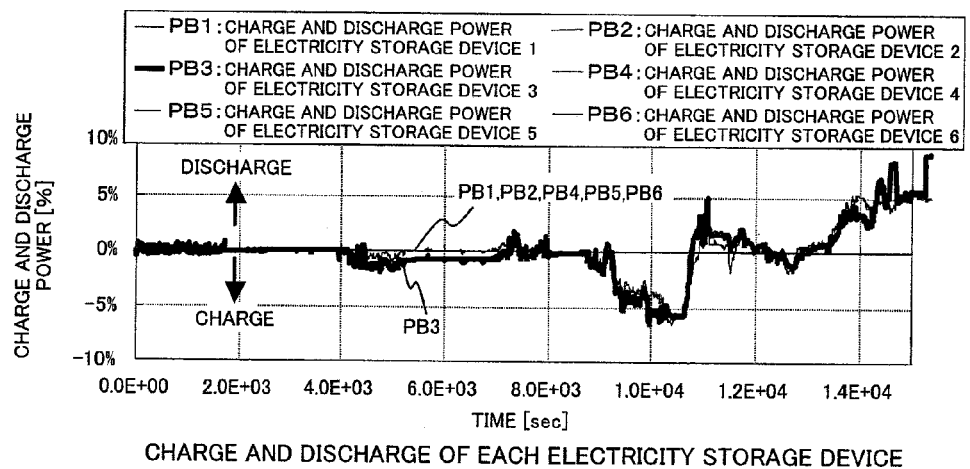
FIG. 13B is an operation condition diagram of the simulation of the case that the wind power station is operated by the general controller installed in the power storage apparatus of the wind power station of the first embodiment shown in FIG. 1, showing the change with time of the charge and discharge power of each of the six electricity storage devices composing the power storage apparatus of the wind power station.
Figure 13C:
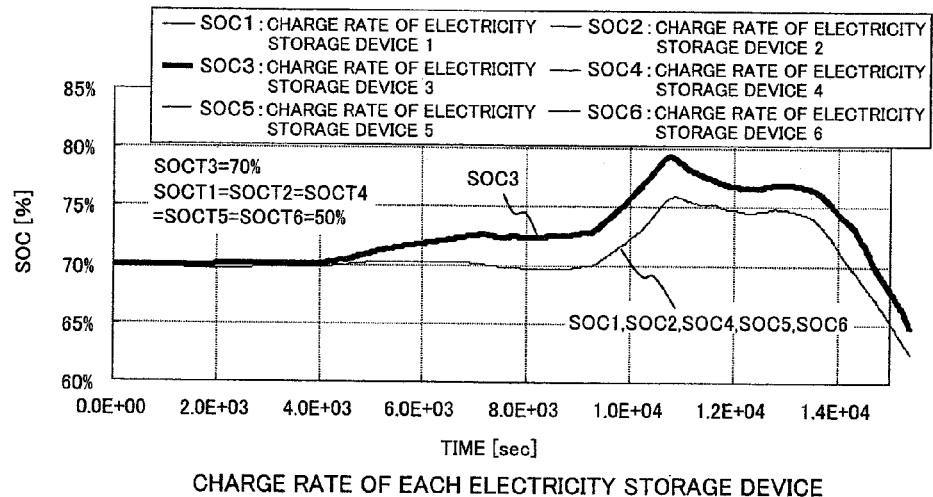
FIG. 13C is an operation condition diagram of the simulation of the case that the wind power station is operated by the general controller installed in the power storage apparatus of the wind power station of the first embodiment shown in FIG. 1, showing the change with time of the respective charge rates SOCs (SOC1, SOC2, SOC3, SOC4, SOC5, SOC6) of the six electricity storage devices of the wind power station.

Next, for an operation example of the wind power station 10 of the first embodiment including the power storage apparatus 2 and the power generation system 1 which are shown in FIG. 1, the results of the simulated operation condition are shown in FIGS. 13A to 13C.

The operation condition examples of the simulated wind power station 10 of the first embodiment shown in FIGS. 13A to 13C show the simulations when six electricity storage devices composing the power storage apparatus 2 are installed.

FIG. 13A shows the change with time of the output power of the wind power station in the wind power station 10 of the first embodiment, and the power in the vertical axis indicates the rated power of the wind power generation system 1 as 100%, and the positive value of the code indicates the discharge direction, and the negative value indicates the charge direction.

And, PW indicates generation power of the wind power generation system 1, PB change and discharge power of the power storage apparatus 2, and PSys output power of the wind power station 10.

As shown in FIG. 13A, the generation power PW of the wind power generation system 1 changes with time, though since the power storage apparatus 2 outputs the charge and discharge power PB so as to relieve the change, the condition of the relieved change of the output power PSys of the wind power station 10 with the generation power PW and charge and discharge power PB combined is shown.

FIG. 13B shows the change with time of the charge and discharge power PB1 to PB6 of each of the six electricity storage devices composing the power storage apparatus 2 in the aforementioned simulation.

Further, in the simulation shown in FIG. 13B, among the six electricity storage devices, the case that the deterioration of the lead-acid battery composing the third electricity storage device progresses is assumed.

As shown in FIG. 13B, among the charge and discharge power PB1, PB2, PB3, PB4, PB5, and PB6 of the six electricity storage devices composing the power storage apparatus 2, the condition of the charge and discharge power PB3 of the third electricity storage device progressing in deterioration indicates a different operation from the charge and discharge power of the other electricity storage devices.

FIG. 13C shows the change with time of the charge rate SOC (SOC1, SOC2, SOC3, SOC4, SOC5, SOC6) of the six electricity storage devices in the aforementioned simulation. In the simulation, it is assumed that the deterioration of the third electricity storage device progresses, so that the SOC target value (SOCT3) of the third electricity storage device is set at 70%. On the other hand, the SOC target values (SOCT1, SOCT2, SOCT4 to SOCT6) of the other five electricity storage devices are set at 50%.

As shown in FIG. 13C, the charge rate (SOC) of each electricity storage device does not coincide with the SOC target value (SOCT), though the reason is that to relieve the generation power change of the wind power generation system 1, the six electricity storage devices composing the power storage apparatus 2 all execute charge and discharge.

Figure 14:
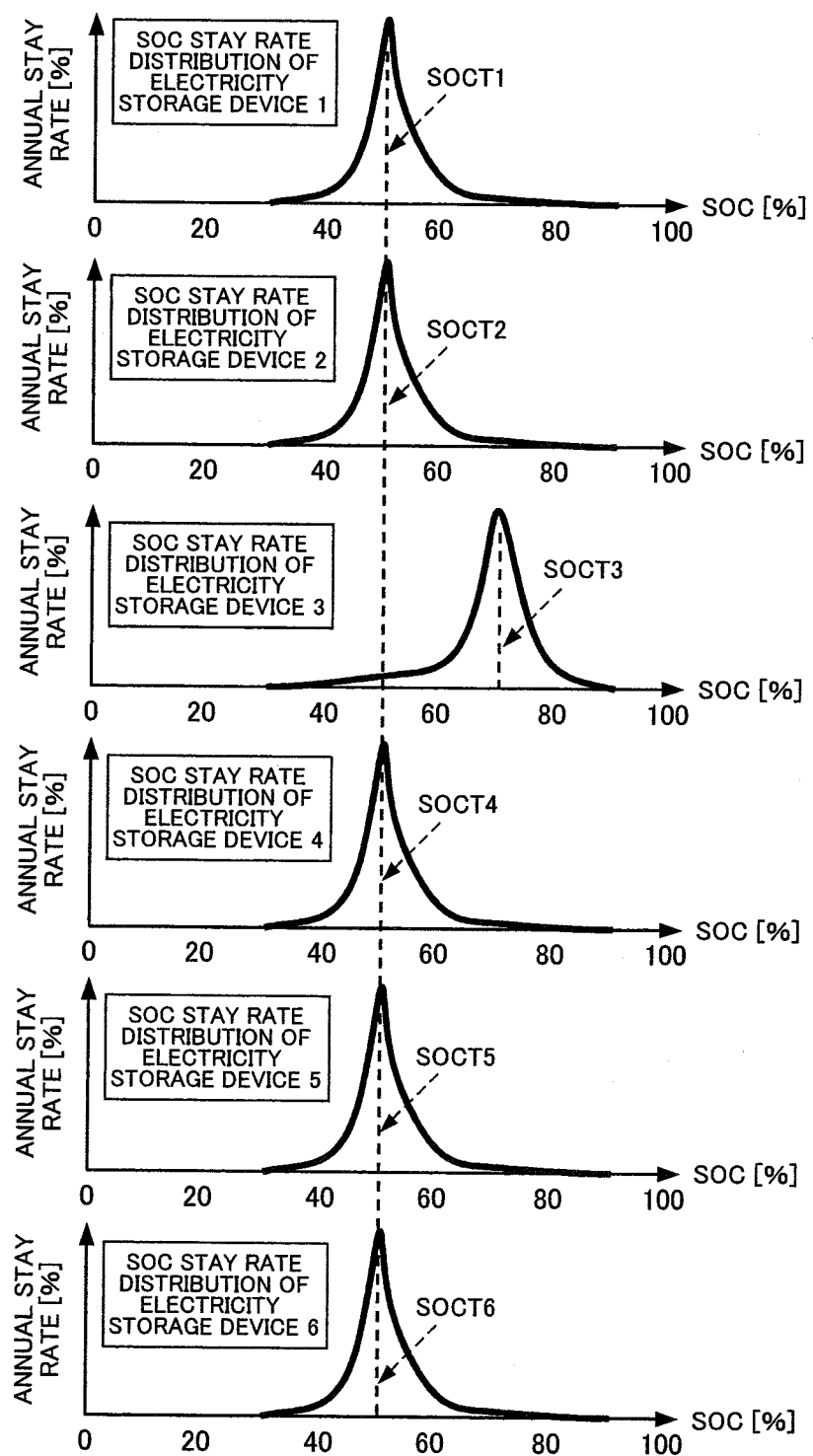
FIG. 14 is an SOC stay rate distribution diagram of the lead-acid batteries used in the power storage apparatus under the simulation condition of the wind power station of the first embodiment shown in FIG. 13.

FIG. 14 shows the SOC stay rate distribution of the lead-acid batteries used in each of the six electricity storage devices composing the power storage apparatus 2 when the wind power station 10 is operated for one year under the simulation condition of the wind power station 10 shown in FIGS. 13A to 13C.

With respect to the SOC stay rate distribution of each electricity storage device, during the operation period of one year, the rate at which the period of the condition of the charge rate (SOC) shown in the horizontal axis occurs during one year is shown as an annual stay rate in the vertical axis.

In FIG. 14, the SOC stay rate of the third electricity storage device 3 deterioration-progressed which is shown at the third place from the top indicates the condition that the number of periods of staying at near 70% which is the SOC target value (SOCT3) is largest.

On the other hand, when the other five electricity storage devices deterioration-unprogressed, since the SOC target values (SOCT1, SOCT2, SOCT4 to SOCT6) are set at 50%, are operated through one year, the condition that the period of staying at near 50% which is the SOC target value is longest is shown.

Therefore, when the wind power station 10 of this embodiment is operated through one year, among the six units of the lead-acid battery 1 to the lead-acid battery 6 installed as electricity storage devices composing the power storage apparatus 2, the charge rate (SOC) of the third lead-acid battery 3 deteriorated is kept at a high value on average, so that further deterioration progress of the deteriorated lead-acid battery 3 can be delayed.

Further, the case that the wind power generation system 1 is used as a power generation system with the generation power changed of this embodiment is indicated, though as a power generation system with the generation power changed, even if a power generation system using natural energy such as a solar photovoltaic system is used, the same effect as that of this embodiment can be produced.

Further, as a power generation system with the generation power changed, even if a compound power generation system combining the wind power generation system, the solar photovoltaic system, and furthermore the aforementioned power generation system using natural energy with a power generation system such as an engine generator is used, the same effect as that of this embodiment can be produced.

According to the power generation system using natural energy of this embodiment, among the plurality of lead-acid batteries which are the electricity storage devices composing the power storage apparatus 2, the rate that the charge rate (SOC) of the lead-acid battery deterioration-progressed stays at a value close to the full charge on the time average can be increased, so that further deterioration progress of the lead-acid battery deterioration-progressed can be delayed.

By this effect, the deterioration progress of each of the plurality of lead-acid batteries included is averaged and consequently, the overall operation period of the power storage apparatus can be extended.

Further, in the power generation system of this embodiment, the example that the lead-acid batteries are used as secondary batteries composing the power storage apparatus 2 is indicated, though even if lithium ion batteries are used as secondary batteries, the same effect as that of this embodiment can be obtained.

However, in the case of the lithium ion batteries, it is generally known that if the charge rate is controlled to a value close to the charge condition, the deterioration progress is suppressed. In this case, it is preferable to cope with it by setting the charge rate target value of a lithium ion battery with deterioration progress inferred to a value smaller than the charge rate target value of the lithium ion battery deterioration-unprogressed.

According to this embodiment, a power storage apparatus of a power generation system for enabling extension of the overall operation period of the power storage apparatus having electricity storage devices for delaying further progress of deterioration of deterioration-progressed secondary batteries among a plurality of secondary batteries composing the electricity storage devices, thereby including both deterioration-progressed secondary batteries and deterioration-unprogressed secondary batteries and an operating method of the power storage apparatus of the power generation system can be realized.

Embodiment 2

Next, the constitution of the wind power station 10 of the second embodiment of the present invention including the power generation system 1 using natural energy with the generation power changed and the power storage apparatus 2 installed in connection with the power generation system 1 will be explained by referring to FIGS. 15 and 16.

The wind power station 10 of the second embodiment of the present invention has the same basic constitution as that of the wind power station 10 of the first embodiment explained previously, so that the explanation of the constitution and operation common to both is omitted and only the constitution and operation different from those of the first embodiment will be explained below.

Figure 15:
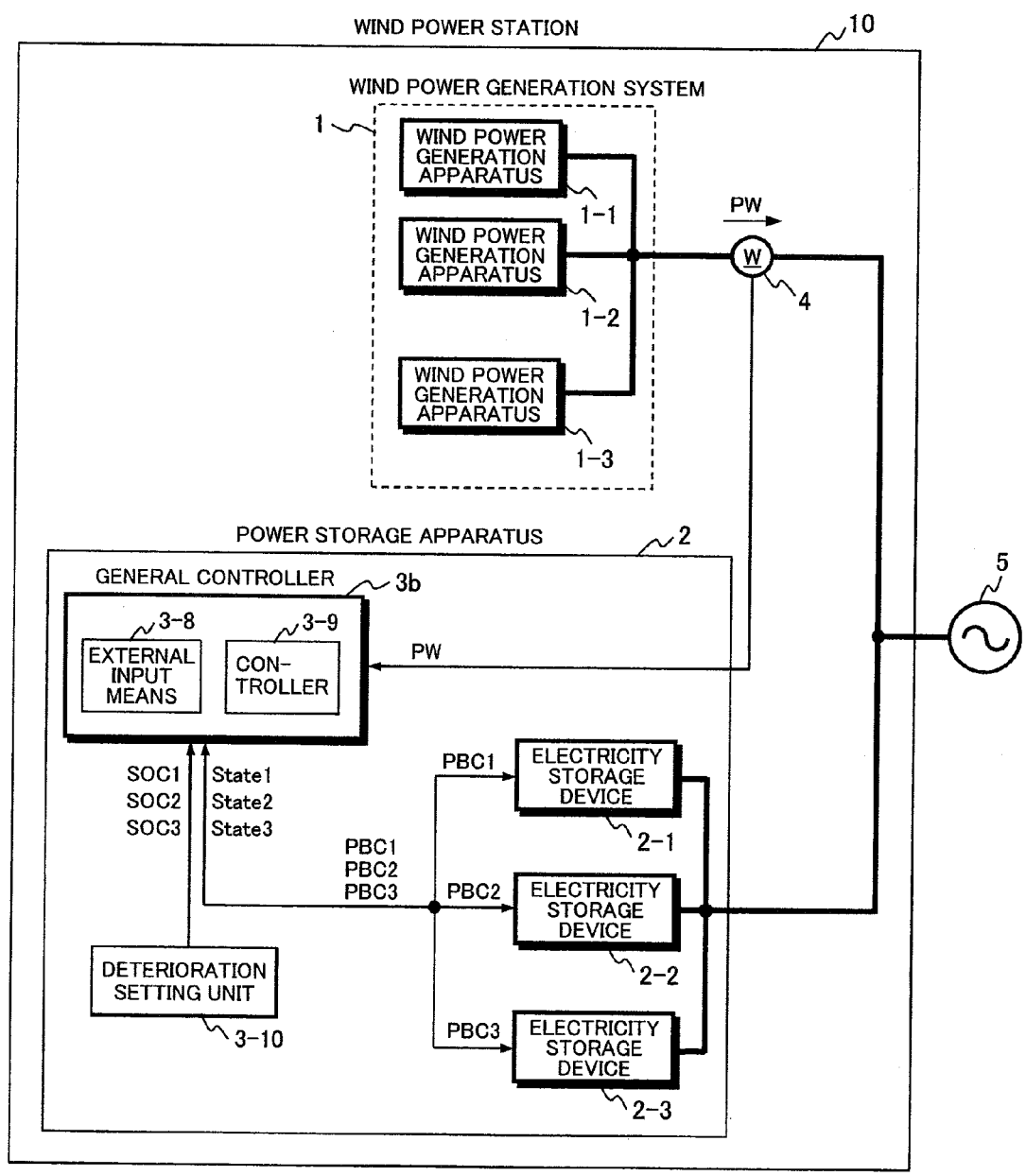
FIG. 15 is a schematic block diagram showing the constitution of the wind power station including the power generation system and power storage apparatus of the second embodiment of the present invention.

A general controller 3b wherein the power storage apparatus 2 of the wind power station 10 of the second embodiment shown in FIG. 15 is structured so as to include an external input means 3-8 for inputting the SOC target value (SOCT) from the outside and a controller 3-9 for inputting the SOC target value from the external input means 3-8.

The general controller 3b is structured so as to input the SOC target value to the controller 3-9 having the SOC management charge and discharge instruction calculator 3-5 included in the general controller 3b.

Figure 16:
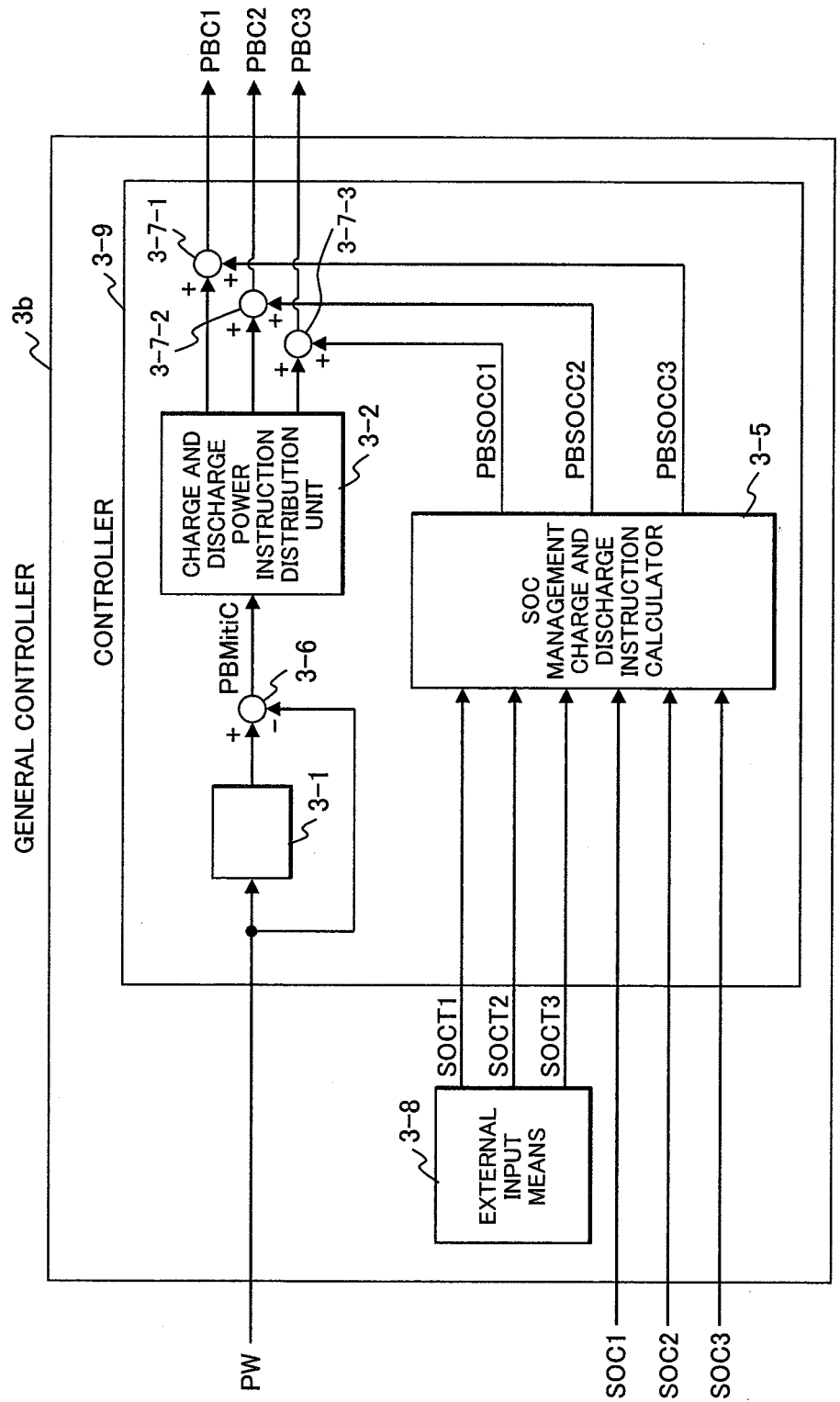
FIG. 16 is a schematic block diagram showing the general controller installed in the power storage apparatus of the wind power station of the second embodiment shown in FIG. 15.

Further, the general controller 3b of this embodiment, as a detailed constitution, as shown in FIG. 16, includes the external input means 3-8 for inputting the SOC target value (SOCT), a microcomputer, and the controller 3-9 having the SOC management charge and discharge instruction calculator 3-5 for calculating the charge and discharge power instructions (PBSOCC1, PBSOCC2, PBSOCC3) transmitted to the electricity storage devices 2-1, 2-2, and 2-3 from the SOC target values (SOCT1, SOCT2, SOCT3) inputted from the external input means 3-8.

The operations of the components of the SOC management charge and discharge instruction calculator 3-5 included in the controller 3-9 are the same as the operations of the SOC management charge and discharge instruction calculator 3-5 shown in FIG. 12, so that the explanation thereof will be omitted here.

Among the components of the general controller 3b of this embodiment, the external input means 3-8 has a function for setting the SOC target values (SOCT1, SOCT2, SOCT3) of the electricity storage devices 2-1, 2-2, and 2-3 from the outside. For example, the external input means 3-8 is composed of a personal computer and the SOC target values (SOCT1, SOCT2, SOCT3) of the electricity storage devices 2-1, 2-2, and 2-3 are inputted from the keyboard composing the personal computer by an operator.

Further, as another example of the external input means 3-8, a graduated slide switch or a graduated rotary switch may be acceptable.

Via the external input means 3-8, the operator manually inputs the SOC target values (SOCT1, SOCT2, SOCT3) of the electricity storage devices 2-1, 2-2, and 2-3. The SOC value to be input is set according to the deterioration degree of the lead-acid batteries composing the electricity storage devices and the respect that for an electricity storage device of a high deterioration degree, the SOC target value is set to a value close to full charge compared with an electricity storage device deterioration-unprogressed is the same as the first embodiment.

Further, as a means for inferring the deterioration of the lead-acid batteries composing the electricity storage devices, the method described in the first embodiment is used. Furthermore, as another deterioration inferring means for the lead-acid batteries composing the electricity storage devices, it is possible to directly infer the deterioration condition by the analytical examination of the second batteries and decide the SOC target value.

Concretely, a part of the battery cell in which the secondary batteries composing the electricity storage devices are connected in series is pulled out and the pulled battery cell is analyzed. The specific gravity of the electrolyte composing the secondary battery cell is examined, thus the deterioration is inferred, and the SOC target value is decided from the deterioration degree.

Further, as another deterioration inferring method of the secondary batteries composing the electricity storage devices, the dischargeable Ah capacity of the secondary batteries may be used.

In this case, it is possible to install a deterioration setting unit 3-10 for setting the charge rate target value SOCT in the general controller 3b and input the charge rate target value SOCT to the external input means 3-8 according to the procedure described in FIG. 17 by the operator.

FIG. 17 is a flow chart showing the method for inferring, with respect to the electricity storage devices of the power storage apparatus of the second embodiment shown in FIG. 15, the deterioration condition of the secondary batteries composing the electricity storage devices from the dischargeable Ah capacity and furthermore deciding the SOC target value.

As shown in FIG. 17, firstly, as a first step of inferring the deterioration condition of the secondary batteries composing the electricity storage devices, the secondary battery of the electricity storage device the dischargeable Ah capacity of which is to be measured is charged up to the full charge condition (SOC=100%).

At the second step of inferring the deterioration condition of the electricity storage devices, the objective electricity storage device is discharged as a fixed current (100A in FIG. 17).

During discharge, the voltage of the unit cell of the secondary batteries composing the electricity storage devices is measured at the same time. If the voltage of the unit cell of the secondary batteries reaches a predetermined value (1.8 [V] in FIG. 17), the discharge is stopped and the time H [hour] required up to the predetermined value is measured.

At the third step of inferring the deterioration condition of the secondary batteries composing the electricity storage devices, the discharge time H [hour] and the fixed current value are integrated, thus the dischargeable capacity G [Ah] is obtained. In the secondary battery deterioration-progressed, it is known that the dischargeable capacity G is reduced and it is a parameter for inferring the deterioration condition.

At the fourth step of inferring the deterioration condition of the secondary batteries composing the electricity storage devices, the SOC target value is decided from the dischargeable capacity G. Concretely, from the table or graph showing the correspondence of the dischargeable capacity G to the SOC target value, the SOC target value is decided. Further, the dischargeable capacity G of the secondary battery deterioration-progressed is small, so that as the dischargeable capacity G is reduced, the SOC target value of the corresponding electricity storage device is set to a large value.

The operations of the general controller 3b and the electricity storage devices 2-1, 2-2, and 2-3 after the SOC target values (SOCT1, SOCT2, SOCT3) are received are the same as those of the first embodiment, so that the explanation thereof will be omitted.

By the operating method of the power storage apparatus of this embodiment, the rate at which the SOC of the lead-acid battery deterioration-progressed stays at a value close to full charge on the time average increases and further deterioration progress of the lead-acid battery deterioration-progressed can be delayed.

As a result, the deterioration progresses of the plurality of lead-acid batteries composing the power storage apparatus are averaged and as a result, the overall operation period of the power storage apparatus can be extended.

According to this embodiment, a power storage apparatus of a power generation system for enabling extension of the overall operation period of the power storage apparatus having electricity storage devices for delaying further progress of deterioration of deterioration-progressed secondary batteries among a plurality of secondary batteries composing the electricity storage devices, thereby including both deterioration-progressed secondary batteries and deterioration-unprogressed secondary batteries and an operating method of the power storage apparatus of the power generation system can be realized.

INDUSTRIAL APPLICABILITY

The present invention can be applied to a power storage apparatus of a power generation system using natural energy and an operating method of the power storage apparatus.

LEGEND

1: Wind power generation system, 1-1, 1-2, 1-3: Wind power generation apparatus, 1-1-1: Blade, 1-1-2: Wind gauge, 1-1-3: Nacelle, 1-1-4: Generator, 1-1-5: Exciter, 1-1-6: AC-DC converter, 1-1-7: Converter, 1-1-8: Linkage transformer, 1-1-9: Circuit breaker, 2: Power storage apparatus, 2-1, 2-2, 2-3: Electricity storage device, 2-1-1, 2-2-1, 2-3-1: Lead-acid battery, 2-1-2, 2-2-2, 2-3-2: Converter, 2-1-3, 2-2-3, 2-3-3: Linkage transformer, 2-1-4, 2-2-4, 2-3-4: Circuit breaker, 3, 3b: General controller, 3-1, 3-1a, 3-1b: Power station output target value calculator, 3-2: Charge and discharge power instruction distribution unit, 3-3, 3-3a: Deterioration index calculator, 3-3a-1, 3-3a-2, 3-3a-3: Internal resistance calculator, 3-3a-4, 3-3a-5, 3-3a-6: Internal resistance-deterioration index corresponding map, 3-3-1, 3-3-2, 3-3-3: Year-deterioration index corresponding map, 3-4: SOC target value calculator, 3-4-1, 3-4-2, 3-4-3: Deterioration degree-SOC target value corresponding map, 3-5: SOC management charge and discharge instruction calculator, 3-5-1, 3-5-2, 3-5-3: Subtracter, 3-5-4, 3-5-5, 3-5-6: Proportional calculator, 3-5-7, 3-5-8, 3-5-9: Limiter calculator, 3-6: Subtracter, 3-7-1, 3-7-2, 3-7-3: Adder, 3-8: External input means, 3-9: Controller, 4: Wattmeter, 5: Power system, 10: Wind power station

The invention claimed is:

1. A power storage apparatus in connection with a power generation system using natural energy having a generation power which changes with time, the power storage apparatus mitigates changes to the generation power of the power generation system, the power storage apparatus comprising:

a plurality of electricity storage devices, where the plurality of electricity storage devices are composed of converters and secondary batteries, and the converters include a charge rate detector for detecting a charge rate of the secondary batteries; and a control unit including a power station output target value calculator for calculating a target value of power station output, a charge and discharge power calculator for calculating a change relief charge and discharge instruction for executing charging and discharging by each of the plurality of electricity storage devices on the basis of the target value of the power station output, a charge rate target value calculator for calculating a charge rate target value of the plurality of electricity storage devices, and a charge rate management charge and discharge instruction calculator for correcting the change relief charge and discharge instruction on the basis of the charge rate target value and the charge rate detected by the charge rate detector and calculating a correction value of a charge and discharge power instruction for instructing the charging and discharging of the electricity storage devices, wherein the converters are configured to control a charge and discharge power of the secondary batteries so as to follow the charge and discharge power instruction from the control unit and to mitigate changes to a combined power formed by adding the power outputted from the power generation system and the charge and discharge power outputted from the power storage apparatus, and wherein the control unit includes a deterioration index calculator for calculating a correction value of the charge rate target value of the power storage apparatus according to characteristics or an operation history of the plurality of secondary batteries and instructing the charge rate target value calculator of the correction value.

2. The power storage apparatus of a power generation system according to claim 1, wherein:

the charge and discharge power instruction calculator includes a charge rate control charge and discharge power instruction calculator for calculating a charge rate control charge and discharge power instruction for controlling the charge rate of the secondary batteries from a difference between the charge rate target value and the detected charge rate, and the charge rate management charge and discharge instruction calculator for calculating the correction value of the charge and discharge power instruction is a calculator for assuming an added value of the change relief charge and discharge instruction and the charge rate control charge and discharge power instruction as a correction value of the charge and discharge power instruction instructed to each of the electric storage devices.

3. The power storage apparatus of a power generation system according to claim 1, wherein:

the secondary batteries are lead-acid batteries and the charge rate target value calculator f, when deterioration of the secondary batteries is inferred by the deterioration condition inference calculator, is configured to set the charge rate target value of the secondary batteries to a charge rate value closer to a full charge than a charge rate target value of non-deteriorated secondary batteries.

4. The power storage apparatus of a power generation system according to claim 1, wherein:

the secondary batteries are lithium ion batteries and the charge rate target value calculator, when deterioration of the secondary batteries inferred by the deterioration condition inference calculator is inferred to progress, is configured to set the charge rate target value of the secondary batteries to a charge rate value closer to a discharge condition than a charge rate target value of non-deteriorated secondary batteries.

5. A power storage apparatus in connection with a power generation system using natural energy having a generation power which changes with time, the power storage apparatus mitigates changes to the generation power of the power generation system the power storage apparatus comprising:

a plurality of electricity storage devices, where the plurality of electricity storage devices are composed of converters and secondary batteries, and the converters include a charge rate calculator for calculating the charge rate of the secondary batteries; and a control unit having a power station output target value calculator for calculating a target value of power station output, a charge and discharge power calculator for calculating a change relief charge and discharge instruction for executing charging and discharging by each of the plurality of electricity storage devices on the basis of the target value of the power station output, an external input unit for inputting a charge rate target value of the plurality of electricity storage devices, and a calculator for correcting the change relief charge and discharge instruction on the basis of the charge rate target value and the calculated charge rate and calculating a correction value of a charge and discharge power instruction for instructing the charging and discharging of the electricity storage devices.

6. An operating method of a power storage apparatus installed in connection with a power generation system using natural energy having a generation power which changes with time, the power storage apparatus mitigating changes to the generation power, where the power storage apparatus has a control unit and a plurality of electricity storage devices, the plurality of electricity storage devices being composed of converters and secondary batteries, the operating method comprising the steps of:

detecting a charge rate of the secondary batteries of the electricity storage devices by a charge rate calculator included in the converters, calculating a power station output target value using power station output target value calculators included in the control unit, and calculating and outputting a charge and discharge power instruction for executing charging and discharging by each of the plurality of electricity storage devices by a charge and discharge power calculator on the basis of the power station output target value;

calculating a correction value of the charge and discharge power instruction calculated by the charge and discharge power calculator using a charge rate management charge and discharge instruction calculator included in the control unit on the basis of a detected charge rate of the secondary batteries and a charge rate target value;

calculating a correction value of the charge rate target value of the power storage apparatus using a deterioration index calculator included in the control unit according to one of characteristics and an operation history of the secondary batteries and instructing a charge rate target value calculator of the correction value of the charge rate target value, and controlling the charging and discharging power of the secondary batteries by the converters so as to follow the charge and discharge power instruction from the control unit, and mitigating changes to a combined power formed by adding the power outputted from the power generation system and the charge and discharge power outputted from the power storage apparatus.

7. The operating method of a power storage apparatus of a power generation system according to claim 6, wherein:

the charge rate management charge and discharge instruction calculator calculates the correction value of the charge and discharge power instruction for controlling the charge rate of the secondary batteries from a difference between the charge rate target value calculated by the charge rate target value calculator and the charge rate detection value detected by the charge rate calculator and assumes an added value of correction values of a change relief charge and discharge instruction and the charge and discharge power instruction as a correction charge and discharge power instruction for correcting the charge and discharge power instruction.

8. The operating method of a power storage apparatus of a power generation system according to claim 6, wherein
the secondary batteries are lead-acid batteries and the charge rate target value of the secondary batteries set by the charge rate target value calculator, when deterioration of the secondary batteries is inferred by a deterioration index calculator, is set to a charge rate value closer to a full charge than to a charge rate target value of non-deteriorated secondary batteries.

9. The operating method of a power storage apparatus of a power generation system according to claim 6, wherein:
the secondary batteries are lithium ion batteries and the charge rate target value of the secondary batteries set by the charge rate target value calculator, when deterioration of the secondary batteries is inferred by a deterioration index calculator, is set to a charge rate value closer to a discharge condition than to a charge rate target value of non-deteriorated secondary batteries.

10. An operating method of a power storage apparatus where the power storage apparatus is installed in connection with a power generation system using natural energy having a generation power which changes with time, the power storage apparatus mitigating changes to the generation power, where the power storage apparatus has a control unit and a plurality of electricity storage devices and the plurality of electricity storage devices are composed of converters and secondary batteries, the operating method comprising the steps of:
calculating a power station output target value using a power station output target value calculator included in the control unit,
calculating a change relief charge and discharge instruction to be charged and discharged by each of the plurality of electricity storage devices by a charge and discharge power calculator included in the control unit on the basis of the power station output target value;
inputting a charge rate target value of the plurality of electricity storage devices by an external input device;
calculating a charge rate of the secondary batteries by a charge rate calculator included in the converters; and
correcting the change relief charge and discharge instruction on the basis of the charge rate target value and the charge rate of the secondary batteries calculated by the charge rate calculator included in the converters, calculating a correction value of the charge and discharge power instruction, and instructing the correction value of the charge and discharge power instruction to each electricity storage device.

11. The operating method of a power storage apparatus of a power generation system according to claim 10, wherein:
the secondary batteries are lead-acid batteries and the charge rate target value is set from a deterioration condition of the secondary batteries and when deterioration of the secondary batteries is inferred, the charge rate target value of the secondary batteries is set to a charge rate closer to a full charge than to a charge rate target value of non-deteriorated secondary batteries.

12. The operating method of a power storage apparatus of a power generation system according to claim 10, wherein:
the secondary batteries are lithium ion batteries and the charge rate target value is set from a deterioration condition of the secondary batteries and when deterioration of the secondary batteries is inferred, the charge rate target value of the secondary batteries is set to a charge rate closer to a discharge condition than to a charge rate target value of non-deteriorated secondary batteries.

13. The operating method of a power storage apparatus of a power generation system according to claim 11, wherein:
the deterioration of the secondary batteries is inferred from a measured discharge capacity of the secondary batteries and as the measured discharge capacity of the secondary batteries is reduced, the deterioration of the secondary batteries is inferred.

* * * * *